(12) United States Patent
Nagata

(10) Patent No.: US 10,354,513 B2
(45) Date of Patent: Jul. 16, 2019

(54) WIRELESS COMMUNICATION APPARATUS, WIRELESS COMMUNICATION SYSTEM, AND WIRELESS COMMUNICATION METHOD

(71) Applicant: FUJITSU LIMITED, Kawasaki-shi, Kanagawa (JP)

(72) Inventor: Jun-ichi Nagata, Kawasaki (JP)

(73) Assignee: FUJITSI LIMITED, Kawasaki (JP)

( * ) Notice: Subject to any disclaimer, the term of this patent is extended or adjusted under 35 U.S.C. 154(b) by 0 days.

(21) Appl. No.: 15/923,702

(22) Filed: Mar. 16, 2018

(65) Prior Publication Data
US 2018/0276971 A1    Sep. 27, 2018

(30) Foreign Application Priority Data

Mar. 24, 2017 (JP) .................. 2017-060132

(51) Int. Cl.
| G08B 21/18 | (2006.01) |
| H02J 7/00 | (2006.01) |
| H04W 92/10 | (2009.01) |
| H02J 7/35 | (2006.01) |

(52) U.S. Cl.
CPC .......... *G08B 21/182* (2013.01); *H04W 92/10* (2013.01); *H02J 7/0029* (2013.01); *H02J 7/35* (2013.01); *H02J 2007/0037* (2013.01)

(58) Field of Classification Search
CPC . G08B 21/182; G06F 3/1454; H04L 41/0806; H04L 67/12; H04L 9/3326; H04L 9/30; H04L 9/14; H04L 9/0618; H04W 92/10; H04B 10/1149; H04B 10/1141
See application file for complete search history.

(56) References Cited

U.S. PATENT DOCUMENTS

| 2004/0032392 | A1* | 2/2004 | Chi | G06F 3/03546 345/156 |
| 2006/0019670 | A1* | 1/2006 | Joung | H04W 48/08 455/450 |
| 2006/0256070 | A1* | 11/2006 | Moosavi | H04B 10/1141 345/104 |
| 2010/0318235 | A1* | 12/2010 | Moss | H04L 67/12 700/295 |
| 2011/0312286 | A1* | 12/2011 | Lin | H04W 52/0254 455/73 |
| 2012/0128367 | A1* | 5/2012 | Yamada | H04B 10/1149 398/118 |

(Continued)

FOREIGN PATENT DOCUMENTS

JP    2016-178014 A    10/2016

*Primary Examiner* — Hoi C Lau
(74) *Attorney, Agent, or Firm* — Arent Fox LLP

(57) ABSTRACT

A wireless communication apparatus includes: an optical sensor; and a wireless communication circuit configured to execute a transmission process that transmits a first signal based on data stored in a storage element and a reception process that receives a second signal in response to the transmission of the first signal, wherein the wireless communication circuit is further configured to write data to the storage element in accordance with the second signal received in the reception process when an output level of the optical sensor is in a first state in which the output level of the optical sensor is equal to or higher than a predetermined threshold.

10 Claims, 17 Drawing Sheets

(56) References Cited

U.S. PATENT DOCUMENTS

| | | | |
|---|---|---|---|
| 2013/0225197 A1 | 8/2013 | McGregor et al. | |
| 2015/0280990 A1* | 10/2015 | Wang | H04L 41/0806 709/224 |
| 2017/0279612 A1* | 9/2017 | Liang | G04G 21/04 |
| 2017/0345020 A1* | 11/2017 | Maza | G06K 19/10 |
| 2018/0276971 A1* | 9/2018 | Nagata | G08B 21/182 |
| 2018/0278327 A1* | 9/2018 | Krajnc | H04B 10/116 |

\* cited by examiner

US 10,354,513 B2

WIRELESS COMMUNICATION APPARATUS, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2017-060132, filed on 24 Mar. 2017, the entire contents of which are incorporated herein by reference.

FIELD

The embodiments discussed herein are related to a wireless communication apparatus, a wireless communication system, and a wireless communication method.

BACKGROUND

A wireless communication apparatus (also referred to as beacon apparatus, beacon, wireless beacon apparatus, or wireless beacon) that repeatedly transmits a signal (packet) that is referred to as beacon signal and includes a relatively small amount of data is known. For example, a method for measuring positions using beacon signals transmitted by a large number of wireless communication apparatuses installed in a building has been studied. In addition, for the purpose of managing equipment such as a lighting device installed on a ceiling, a method for managing equipment using beacon signals from a wireless communication apparatus installed near the equipment to be managed has been studied.

Examples of the related art include U.S. Patent Application Publication No. 2013/0225197 and Japanese Laid-open Patent Publication No. 2016-178014.

SUMMARY

According to an aspect of the invention, a wireless communication apparatus includes: an optical sensor; and a wireless communication circuit configured to execute a transmission process that transmits a first signal based on data stored in a storage element and a reception process that receives a second signal in response to the transmission of the first signal, wherein the wireless communication circuit is further configured to write data to the storage element in accordance with the second signal received in the reception process when an output level of the optical sensor is in a first state in which the output level of the optical sensor is equal to or higher than a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Details of a beacon signal to be transmitted by a wireless communication apparatus are to be changed in some cases. For example, upon initial introduction, a worker may consider that a value based on an installation location is to be set in a wireless communication apparatus. Alternatively, the worker may consider that a value set in an installed wireless communication apparatus is to be changed based on a change in a layout to be managed.

In such cases, it is useful to employ a wireless communication technique to instruct a wireless communication apparatus to be changed to write data to a memory. It is, however, difficult for a worker to confirm whether or not a wireless communication apparatus visually recognized by the worker as an apparatus to be changed matches a wireless communication apparatus that executes a process of writing data based on a signal to instruct to write the data. For example, since information is transmitted using a technique in which it is difficult to visually perceive whether or not the information has reached a destination in the wireless communication technique, it is difficult to visually confirm whether or not an instruction has reached a visually confirmed wireless communication apparatus in the wireless communication technique. Installing a display device such as a screen in a wireless communication apparatus in order to solve the aforementioned problem may inhibit the achievement of the downsizing of the wireless communication apparatus and a reduction in the cost of the wireless communication apparatus. Thus, a screen for displaying information is not installed in a wireless communication apparatus that transmits a beacon signal, or only a less-useful output device that turns on a lamp is installed in the wireless communication apparatus. Under such an environment, it is not easy to confirm that a wireless communication apparatus visually confirmed by a worker is writing data based on an instruction to write the data. In other words, it is difficult to confirm that a process of writing data is not executed by a wireless communication apparatus that is different from a wireless communication apparatus visually confirmed by the worker.

In an aspect of the present description, provided are technologies for matching a wireless communication apparatus recognized by a worker as an apparatus to be changed with a wireless communication apparatus that executes a process of writing data based on a signal to instruct to write the data.

Embodiments are described below with reference to the accompanying drawings. Configurations described in the embodiments are examples, and the disclosure is not limited to the configurations described in the embodiments.

First Embodiment

Figure 1:
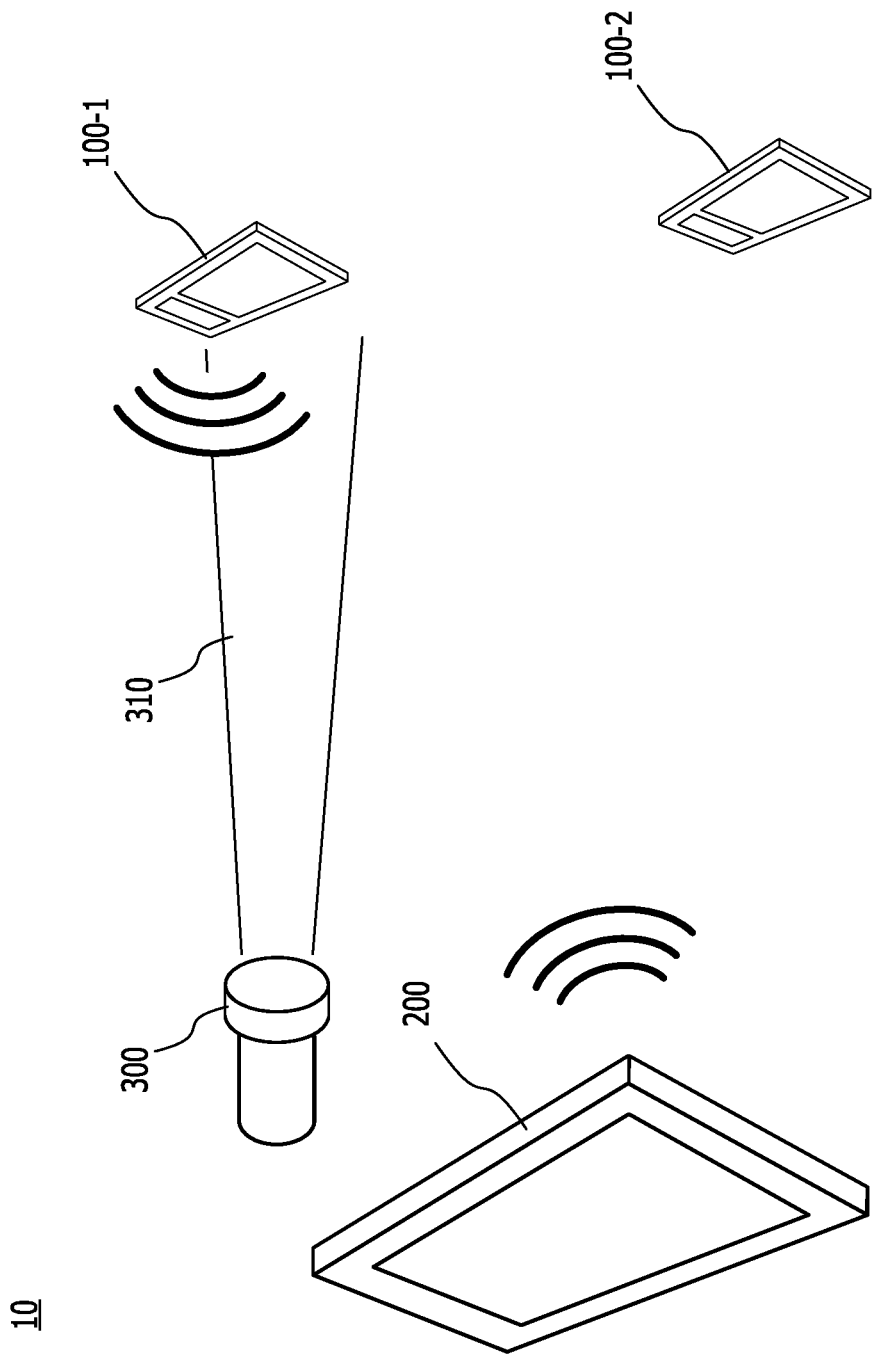
FIG. 1 is a diagram illustrating an overview of a wireless communication system according to a first embodiment.

FIG. 1 is a diagram illustrating an overview of a wireless communication system 10 according to a first embodiment. The wireless communication system 10 illustrated in FIG. 1 includes wireless communication apparatuses 100 (100-1 and 100-2) and a setting apparatus 200. FIG. 1 illustrates the wireless communication apparatus 100-1 and the wireless communication apparatus 100-2 as an example, but the wireless communication system 10 is not limited to this. The wireless communication system 10 may include one or more wireless communication apparatuses 100.

In the wireless communication system 10, each wireless communication apparatus 100 is configured to transmit a beacon signal based on data stored in a memory and includes an optical sensor (may be referred as to "an optical sensor circuit", "a light receiving element", "a photo detection element", "a photo detector", "a light receiving element circuit", "a photo detection element circuit"). The optical sensor is configured so that when the optical sensor receives light 310 from a light source 300, an output level of the optical sensor is in a first state (hereinafter also referred to as high output state), and that when the optical sensor does not receive the light 310 from the light source 300, the output level of the optical sensor is in a second state (hereinafter referred to as low output state or state different from the high output state) different from the first state. In this disclosure, it is to be noted that the output level in the high output state relatively higher than the output level in the second state, but may not be absolutely higher than the output level in the second state. Similarly, it is to be noted that the output level in the low output state is relatively lower than the output level in the first state, but may not be absolutely lower than the output level in the first state. In other words, the output level of the optical sensor in the high output state (first state) is equal to or higher than a threshold, while the output level of the optical sensor in the low output state (second state) is lower than the threshold.

When the output level of the optical sensor is in the first state, the wireless communication apparatus 100 transmits a first signal including first information indicating that a connection request is allowed. When the output level of the optical sensor is in the second state, the wireless communication apparatus 100 transmits the first signal including second information indicating that the connection request is not allowed. In the example illustrated in FIG. 1, the wireless communication apparatus 100-1 receives the light 310 from the light source 300 and transmits the first signal including the first information indicating that the connection request is allowed. On the other hand, the wireless communication apparatus 100-2 does not receive the light 310 from the light source 300 and does not transmit the first signal including the first information indicating that the connection request is allowed. When a wireless communication apparatus 100 does not receive the light 310 from the light source 300, the wireless communication apparatus 100 may not transmit any signal or may transmit the first signal including the second information indicating that the connection request is not allowed.

When the setting apparatus 200 receives the first signal from a wireless communication apparatus 100, and the first signal includes the first information indicating that the connection request is allowed, the setting apparatus 200 transmits, to the wireless communication apparatus that has transmitted the first signal, a signal (hereinafter also referred to as second signal) to instruct to write data.

If the output level of an optical sensor included in a wireless communication apparatus 100 is in the high output state, the wireless communication apparatus 100 uses a receiving circuit to receive the second signal from the setting apparatus 200 within a predetermined time period after the transmission of the first signal, and writes the data to a memory based on the received second signal. In the example illustrated in FIG. 1, since the output level of the optical sensor of the wireless communication apparatus 100-1 is in the high output state due to the light 310 from the light source 300, the wireless communication apparatus 100-1 writes the data to a memory of the wireless communication apparatus 100-1 based on the second signal received from the setting apparatus 200. On the other hand, the wireless communication apparatus 100-2 does not receive the light 310 from the light source 300, and the output level of the optical sensor of the wireless communication apparatus 100-2 is not in the high output state. Thus, the wireless communication apparatus 100-2 does not write the data based on the second signal, even when the second signal is transmitted from the setting apparatus 200.

Thus, a worker uses the light source 300 to illuminate a wireless communication apparatus 100 visually recognized as an apparatus to be changed, thereby determining the wireless communication apparatus 100 that writes the data to the memory based on the second signal transmitted from the setting apparatus 200, and easily identifying the wireless communication apparatus 100 to be changed. In the example illustrated in FIG. 1, the setting apparatus 200 is separated from the light source 300, but may include the light source 300. For example, if the light source 300 is installed in the setting apparatus 200 so that the light source 300 outputs the light 310 from a surface (also referred to as back surface) of the setting apparatus 200 that is located opposite to a surface (also referred to as front surface) in which a display device is installed, the worker may illuminate a wireless communication apparatus 100 with the light 310 while referencing a screen of the setting apparatus 200. In this case, the setting apparatus 200 having the light source 300 installed therein is useful.

Figure 2:
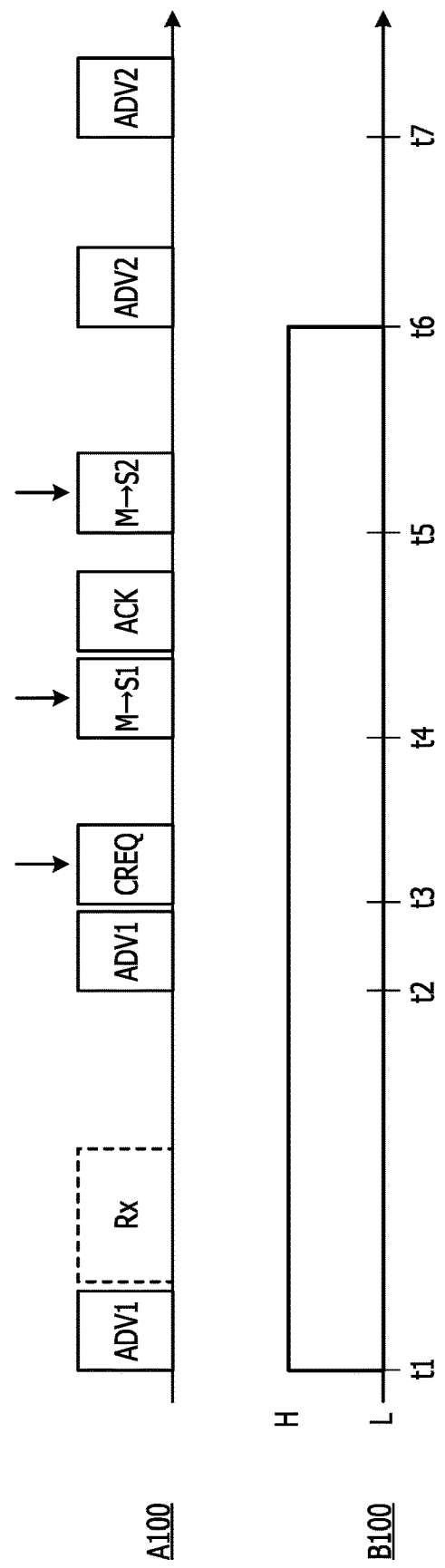
FIG. 2 is a diagram illustrating an example of an overview of operations of each of wireless communication apparatuses according to the first embodiment.

FIG. 2 is a diagram illustrating an example of an overview of operations of each of the wireless communication apparatuses 100 according to the first embodiment. FIG. 2 illustrates, as an example, a time zone (indicated by A100) including a transmission time period during which the wireless communication apparatus 100 executes transmission and a reception time period during which the wireless communication apparatus 100 executes reception, and the states (indicated by B100) of the output level of the optical sensor. The transmission period and the reception period are chronologically separated from each other.

At time t1 illustrated in FIG. 2, the optical sensor receives the light 310 from the light source 300, the output level of the optical sensor is changed to the high output state (H), and the wireless communication apparatus 100 transmits the first signal (ADV1) including the first information indicating the connection request is allowed. For example, if Bluetooth (registered trademark) Low Energy (hereinafter also referred to as BLE) is used as a wireless communication scheme between the wireless communication apparatus 100 and the setting apparatus 200, the first signal including the first information may be an ADV_IND packet. The ADV_IND packet is an advertising packet in which ADV_IND (0000) is set in PDU Type (4-bit length) of Advertising Channel PDU Header. Specifically, PDU Type in which ADV_IND is set is an example of the first information indicating the connection request is allowed. In the ADV_IND packet, a useful value to be used to execute a BLE advertising sequence may be set. For example, information identifying the wireless communication apparatus 100, information on a service to be provided by the wireless communication apparatus 100 to another apparatus conforming to the BLE communication standard, or the like may be set in the ADV_IND packet. Thus, the setting apparatus 200 may display, on the screen, information on the wireless communication apparatus 100 that has transmitted the ADV_IND packet, based on the various types of information set in the ADV_IND packet.

FIG. 2 illustrates the reception time period (Rx) in which the wireless communication apparatus 100 waits for the connection request from the setting apparatus 200 after the transmission of the first signal at the time t1. In the reception time period, however, the wireless communication apparatus 100 does not detect the connection request from the setting apparatus 200. This is due to the fact that the setting apparatus 200 may fail to receive the first signal transmitted at the time t1 or may wait for an instruction from the user (worker) after the setting apparatus 200 has successfully received the first signal. If the wireless communication apparatus 100 does not detect the connection request within the reception time period, the wireless communication apparatus 100 inactivates an RF circuit (including a transmitting circuit and the receiving circuit) and causes the RF circuit to be in a stopped state until the next activation time. This may save consumption power.

At time t2, the output level of the optical sensor is in the high output state (H), and the wireless communication apparatus 100 transmits the first signal (ADV1) including the first information indicating that the connection request is allowed. Then, at time t3 within a reception time period after the transmission of the first signal, the wireless communication apparatus 100 receives the connection request (CREQ) from the setting apparatus 200. For example, if BLE is used as the wireless communication scheme between the wireless communication apparatus 100 and the setting apparatus 200, the connection request (CREQ) may be a CONNECT_REQ packet. The CONNECT_REQ packet is an advertising packet in which CONNECT_REQ (0101) is set in PDU Type of Advertising Channel PDU Header. PDU Payload of the CONNECT_REQ packet includes setting information on time within a reception time period in which the wireless connection apparatus 100 receives the second signal from the setting apparatus 200. In the reception time period based on the setting information included in the connection request, the wireless communication apparatus 100 uses the receiving circuit to detect the second signal from the setting apparatus 200. As a result, at time t4, the wireless communication apparatus 100 receives the second signal (M→S1) from the setting apparatus 200. In the example illustrated in FIG. 2, after receiving the second signal (M→S1), the wireless communication apparatus 100 transmits, to the setting apparatus 200, a signal (ACK) indicating that the wireless communication apparatus 100 has successfully received the second signal.

At time t5 after a connection time interval based on the setting information after the time t4 when the wireless communication apparatus 100 has detected the second signal, the wireless communication apparatus 100 receives a signal (M→S2) indicating the termination of the connection from the setting apparatus 200 and terminates the connection between the wireless communication apparatus 100 and the setting apparatus 200. For example, if BLE is used as the wireless communication scheme between the wireless communication apparatus 100 and the setting apparatus 200, the signal (M→S2) indicating the termination of the connection may be an LL_TERMINATE_IND packet. The LL_TERMINATE_IND packet is a data channel PDU in which LL_TERMINATE_IND (0x02) is set in Opcode (1 octet) of LL control PDU Payload.

After that, at time t6 and time t7, the wireless communication apparatus 100 does not receive the light 310 from the light source 300, the output level of the optical sensor is in the low output state (L), and the wireless communication apparatus 100 transmits the first signal (ADV2) including the second information indicating that the connection request is not allowed. For example, if BLE is used as the wireless communication scheme between the wireless communication apparatus 100 and the setting apparatus 200, the first signal (ADV2) including the second information may be an ADV_NONCONN_IND packet. The ADV_NONCONN_IND packet is an advertising packet in which ADV_NONCONN_IND (0010) is set in PDU Type (4-bit length) of Advertising Channel PDU Header. Specifically, PDU Type in which ADV_NONCONN_IND is set is an example of the first information indicating that the connection request is allowed. In the ADV_NONCONN_IND packet, a useful value to be used to execute the BLE advertising sequence may be set. For example, information identifying the wireless communication apparatus 100, information on a service to be provided by the wireless communication apparatus 100 to another apparatus conforming to the BLE communication standard, or the like may be set. The setting apparatus 200 may display, on the screen, information on the wireless communication apparatus 100 that has transmitted the ADV_NONCONN_IND packet, based on the various types of information set in the ADV_NONCONN_IND packet. In this case, the displayed information is useful if the displayed information enables the wireless communication apparatus 100 to be easily distinguished from another wireless communication apparatus 100 that transmits an ADV_IND packet or in which the output level of a optical sensor is in the high output state. Alternatively, the setting apparatus 200 may not display, on the screen, the information on the wireless communication apparatus 100 that has transmitted the ADV_NONCONN_IND packet. Since the output level of the optical sensor of the wireless communication apparatus 100 that has transmitted the ADV_NONCONN_IND packet is not in the high output state, the wireless communication apparatus 100 that has transmitted the ADV_NONCONN_IND packet is not illuminated by the worker with the light 310 from the light source 300.

In the example illustrated in FIG. 2, at the time t6 and t7, the output level of the optical sensor is in the low output state (L) or not in the high output state, and the wireless communication apparatus 100 inactivates the RF circuit and causes the RF circuit to be in the stopped state until the next activation time without receiving a signal from the setting apparatus 200 in a reception time period after the transmission of the first signal (ADV2) including the second information. Thus, even when the second signal is transmitted by the setting apparatus 200, the wireless communication apparatus 100 does not write data to the memory based on the second signal from the setting apparatus 200.

The example illustrated in FIG. 2 describes the sequence in which the wireless communication apparatus 100 transmits the first signal including the first information, receives the connection request from the setting apparatus 200, and receives the second signal after the reception of the connection request, but the disclosure is not limited to this. For example, after the wireless communication apparatus 100 transmits the first signal (ADV1) including the first information at the time t2, the wireless communication apparatus 100 may receive the second signal (M→S1) from the setting apparatus 200 at the time t3.

It is to be noted that the example illustrated in FIG. 2 does not describe all procedures in the communication sequence conforming to BLE and omits a part of the procedures in order to simplify the description.

Figure 3:
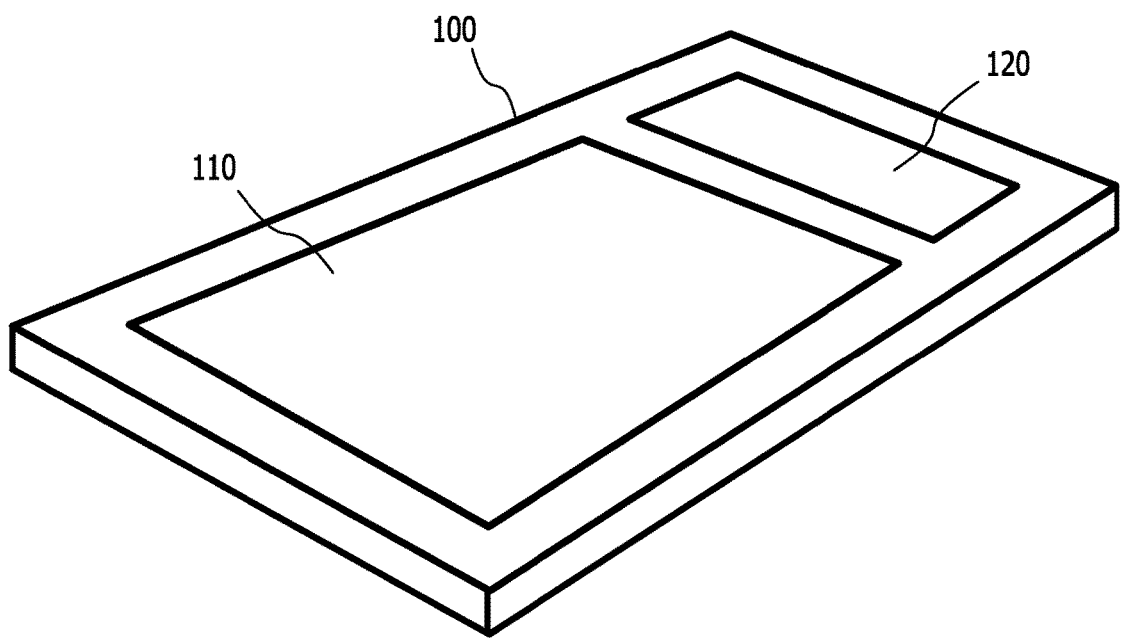
FIG. 3 is a diagram illustrating the appearance of each of the wireless communication apparatuses according to the first embodiment.

FIG. 3 is a diagram illustrating the appearance of each of the wireless communication apparatuses 100. A wireless communication apparatus 100 illustrated in FIG. 3 includes a optical sensor 110 and a wireless communication circuit 120. In the wireless communication apparatus 100, a conductive paste is printed on a flexible silicon sheet to form a wiring, and the wiring is bonded to the optical sensor 110 and the wireless communication circuit 120 by a conductive adhesive so that the optical sensor 110 and the wireless communication circuit 120 are electrically connected to each other.

The optical sensor 110 is configured to receive light and supply electric charges to the wireless communication circuit 120. For example, a photodiode, a solid-state imaging sensor, a photoresistor, a solar battery (also referred to as photovoltaic element), or the like may be used as the optical sensor 110.

The wireless communication circuit 120 is configured to execute a process of transmitting the first signal based on data stored in a memory and execute a process of receiving the second signal in response to the transmission of the first signal and includes a storage element. The wireless communication circuit 120 is also configured to acquire the output level of the optical sensor. If the output level of the optical sensor is in the high output state, the wireless communication circuit 120 operates to write data to the memory based on the second signal received in the reception process. If the output level of the optical sensor is not in the high output state, the wireless communication circuit 120 does not write data to the memory based on the second signal.

Figure 4:
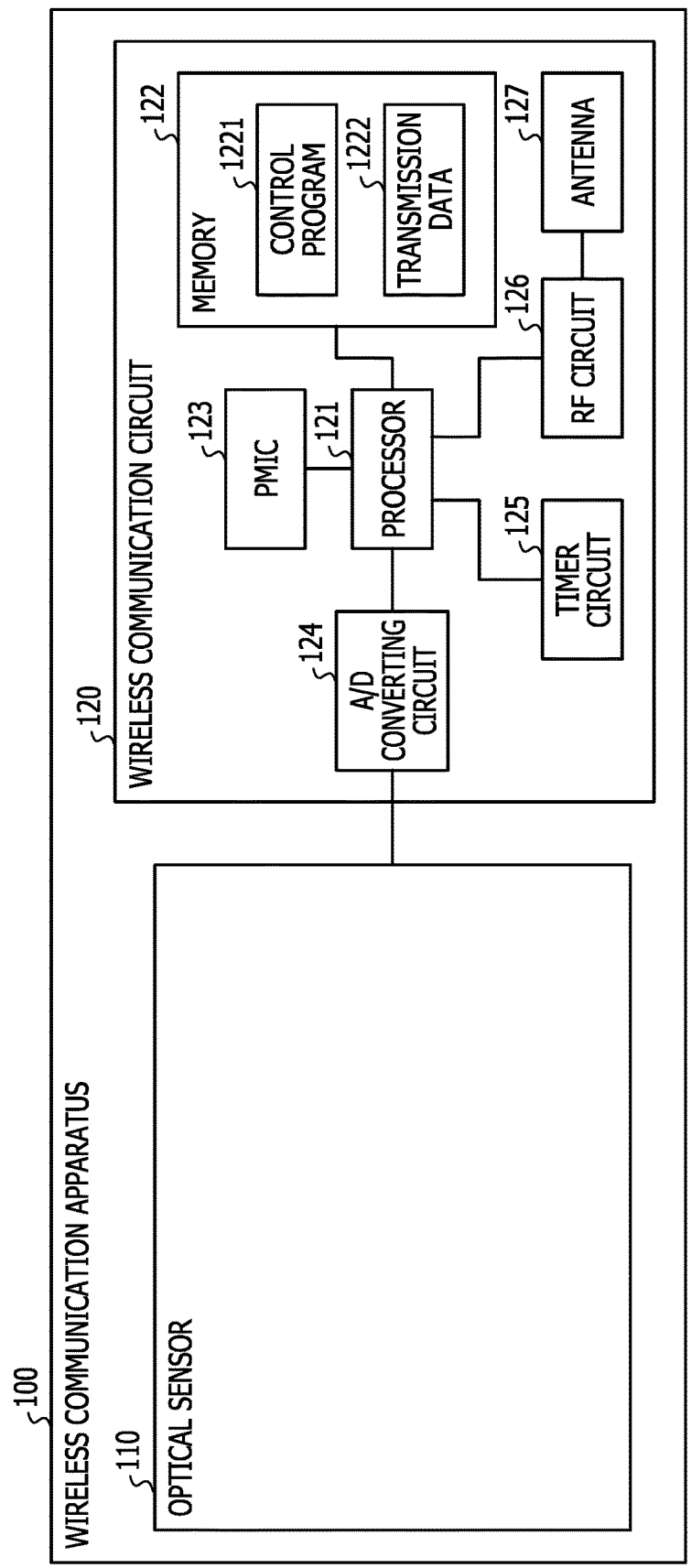
FIG. 4 is a diagram illustrating an example of a hardware configuration of each of the wireless communication apparatuses according to the first embodiment.

FIG. 4 is a diagram illustrating an example of a hardware configuration of each of the wireless communication apparatuses 100 according to the first embodiment. A wireless communication apparatus 100 illustrated in FIG. 4 includes an optical sensor 110 and a wireless communication circuit 120 that are electrically connected to each other via a wiring.

As described above, the optical sensor 110 receives light and outputs electric charges. For example, a photodiode, a solid-state imaging sensor, a photoresistor, a solar battery (also referred to as photovoltaic element), or the like may be used as the optical sensor 110. In the example illustrated in FIG. 4, the optical sensor 110 is configured to receive light and supply electric charges to the wireless communication circuit 120.

In the example illustrated in FIG. 4, the wireless communication circuit 120 includes a processor 121, a memory 122, a power management integrated circuit (PMIC) 123, an analog-to-digital (A/D) converting circuit 124, a timer circuit 125, a radio frequency (RF) circuit 126, and an antenna 127. The wireless communication circuit 120 may be implemented as a single chip circuit formed by installing the sections 121 to 127 in a single package or may be implemented as multiple chip circuits formed by separating a part of the sections 121 to 127 from the other part of the sections 121 to 127.

The processor 121 is configured as a hardware circuit that executes the processes of the wireless communication apparatus 100 according to the first embodiment by executing various programs including a control program 1221 stored in the memory 122. Examples of the processor 121 are a central processing unit (CPU), a micro processing unit (MPU), a digital signal processor (DSP), and a field programmable gate array (FPGA). The processor 121 may be a multi-core processor including two or more cores. Alternatively, the processor 121 may be implemented as a microcontroller formed by installing the processor 121 and other sections such as the memory 122 and the timer circuit 125 in a single integrated circuit.

The memory (also referred to as storage element) 122 is configured to store and hold various programs including the control program 1221 to be executed by the processor 121 and various types of data such as transmission data 1222 to be used for the process of transmitting the first signal. The memory 122 includes either or both of a nonvolatile storage device and a volatile storage device. Examples of the memory 122 are a random access memory (RAM), a read only memory (ROM), a solid state drive (SSD), and a hard disk drive (HDD).

The PMIC 123 is configured to generate, from power supplied to the wireless communication circuit 120, power appropriate as operational power of the processor 121 and supply the generated power to the processor 121. In addition, the PMIC 123 is configured to supply operational power to the memory 122, the A/D converting circuit 124, the timer circuit 125, and the RF circuit 126 via the processor 121. The PMIC 123 may be configured to supply the operational power directly to the memory 122, the A/D converting circuit 124, the timer circuit 125, and the RF circuit 126 without causing the operational power to pass through the processor 121. In the first embodiment, a supply source that supplies the power to the wireless communication circuit 120 is not limited. Each of the wireless communication apparatuses 100 according to the first embodiment may include a battery as a supply source for supplying power to a wireless communication circuit 120 or may use a commercial power source for supplying power to the wireless communication circuit 120 from an external terminal of the wireless communication apparatus 100.

The A/D converting circuit 124 is configured to convert an analog signal to a digital signal. The A/D converting circuit 124 operates to receive a signal (analog signal) output from the optical sensor 110, convert the received signal to an output level value (digital signal) able to be processed by the processor 121, and input the output level value to the processor 121.

The timer circuit 125 is configured to receive a request to measure time from the processor 121 and start counting based on a standard clock. The timer circuit 125 is also configured to transmit an interrupt signal to the processor 121 and cause the processor 121 to recover from a power saving state when a value counted by the timer circuit 125 reaches a timer value set in advance.

The RF circuit 126 includes a transmitting circuit and a receiving circuit. The transmitting circuit is configured to transmit a radio signal via the antenna 127 based on an instruction from the processor 121 in accordance with a predetermined wireless communication scheme. The receiving circuit is configured to receive a radio signal via the antenna 127. An example of the predetermined wireless communication scheme is a near-field communication scheme such as BLE.

Figure 5:
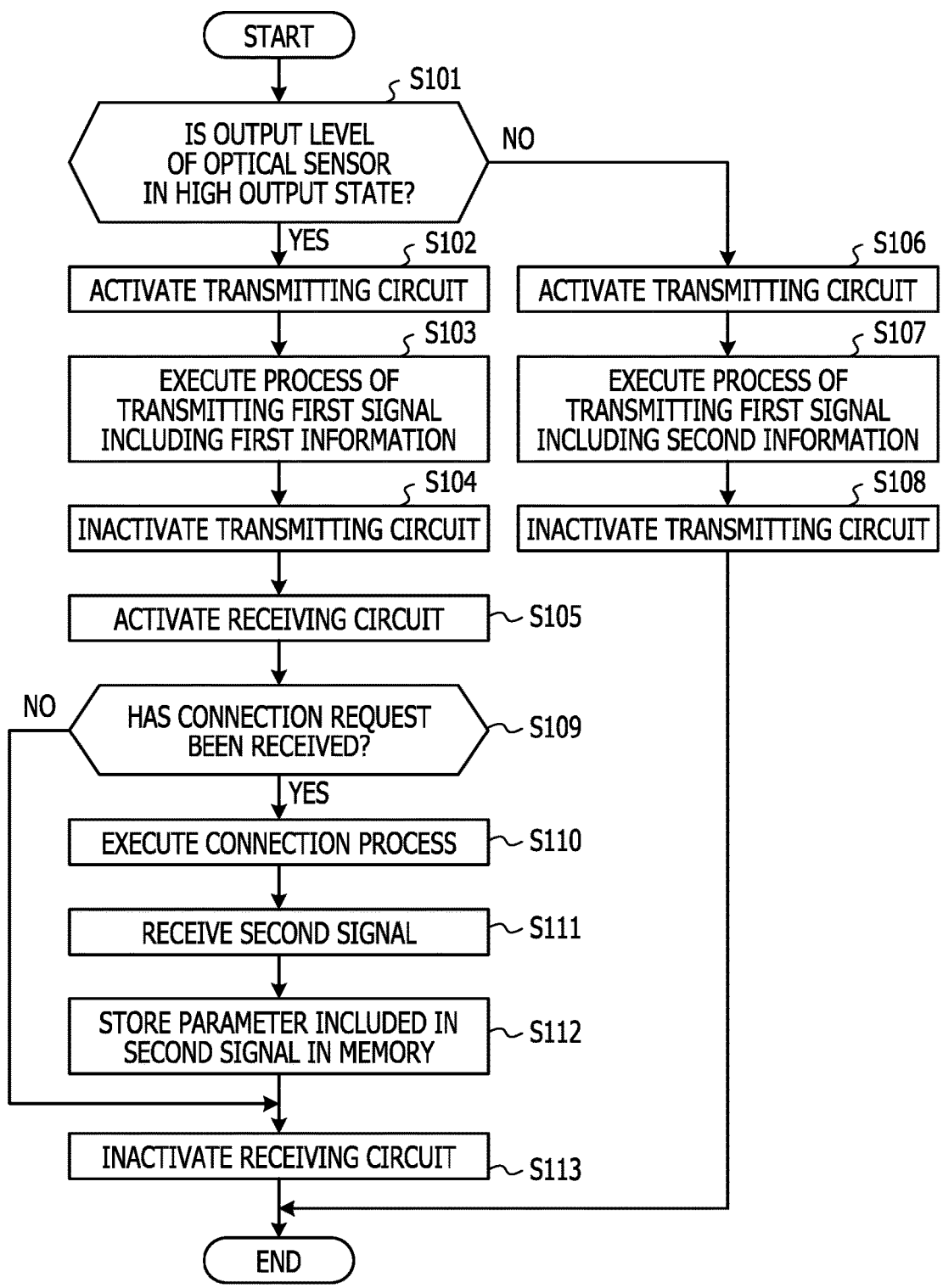
FIG. 5 is a diagram illustrating an example of the flow of a process to be executed by each of the wireless communication apparatuses according to the first embodiment.

FIG. 5 is a diagram illustrating an example of the flow of a process to be executed by each of the wireless communication apparatuses 100 according to the first embodiment. The flow of a process illustrated in FIG. 5 may be started when an interrupt signal (also referred to as activation instruction) is input to the processor 121 from the timer circuit 125. In the example illustrated in FIG. 5, hexagonal boxes indicate determination processes or branch processes. For example, process S101 and process S109 are the determination processes (branch processes). The same applies to the disclosure.

The processor 121 determines whether or not the output level of the optical sensor is in the high output state (in S101). For example, if the output level, acquired via the A/D converting circuit 124, of the optical sensor is equal to or higher than the threshold, the processor 121 may determine that the output level of the optical sensor is in the high output state. On the other hand, if the output level, acquired via the A/D converting circuit 124, of the optical sensor is lower than the threshold, the processor 121 may determine that the output level of the optical sensor is not in the high output state. The threshold may be determined as a value exceeding a normal range, estimated in an operational environment of the wireless communication apparatus 100, of the output level of the optical sensor. For example, the processor 121 may measure the range of the output level of the optical sensor affected by environmental light in the operational environment of the wireless communication apparatus 100 and cause a value that is in the measured range and may remove an effect of the environmental light to be stored in the memory 122 of the wireless communication apparatus 100 in advance. In other words, the value that may remove the effect of the environmental light estimated in the operational environment of the wireless communication apparatus 100 may be set as the threshold.

If the processor 121 determines that the output level of the optical sensor is not in the high output state (NO in S101), the processor 121 activates the transmitting circuit included in the RF circuit 126 (in S106), executes the process of transmitting the first signal including the second information (in S107), and inactivates the transmitting circuit after the transmission of the first signal (in S108). Then, the processor 121 transmits a request to measure time to the timer circuit 125, transitions to the power saving state, and terminates the flow of the process illustrated in FIG. 5. The second information indicates that the connection request is not allowed. For example, in process S107, the processor 121 may execute a process of transmitting an advertising packet (also referred to as ADV_NONCONN_IND packet) in which ADV_NONCONN_IND (0010) is set in PDU Type (4-bit length) of Advertising Channel PDU Header. In process S107, the processor 121 may set information on the wireless communication apparatus 100 in Advertising Channel PDU Payload. Examples of the information on the wireless communication apparatus 100 are information (device address (also referred to as AdvA) to be used to identify the wireless communication apparatus 100, the name (local name), to be displayed in the setting apparatus 200 for the worker, of the wireless communication apparatus 100, arbitrary information (manufacture specific data) added to the wireless communication apparatus 100, and transmission power (Tx power level) of the first signal.

If the processor 121 determines that the output level of the optical sensor is in the high output state (YES in S101), the processor 121 activates the transmitting circuit included in the RF circuit 126 (in S102), executes the process of transmitting the first signal including the first information (in S103), and inactivates the transmitting circuit after the transmission of the first signal (in S104). The first information indicates that the connection request is allowed. For example, if BLE is used, the processor 121 may execute a process of transmitting an advertising packet (also referred to as ADV_IND packet) in which ADV_IND (0000) is set in PDU Type (4-bit length) of Advertising Channel PDU Header in process S103.

After executing the process (S103) of transmitting the first signal including the first information, the processor 121 activates the receiving circuit included in the RF circuit 126 and executes the reception process (in S105). Then, if the wireless communication apparatus 100 does not detect the reception of the connection request from the setting apparatus 200 within a predetermined time period (NO in S109), the processor 121 inactivates the receiving circuit (in S113), transmits a request to measure time to the timer circuit 125, transitions to the power saving state, and terminates the flow of the process illustrated in FIG. 5.

If the wireless communication apparatus 100 receives the connection request from the setting apparatus 200 within the predetermined time period (YES in S109), the processor 121 executes a connection process based on the setting information included in the connection request (in S110) and receives the second signal from the setting apparatus 200 (in S111). If the wireless communication apparatus 100 has successfully received the second signal in process S111, the processor 121 may activate the transmitting circuit included in the RF circuit 126, transmit a signal (also referred to as ACK signal) indicating the success of the reception of the second signal, and execute a process of inactivating the transmitting circuit after the transmission of the ACK signal. If the wireless communication apparatus 100 has failed to receive the second signal in process S111, the processor 121 may activate the transmitting circuit included in the RF circuit 126, transmit a signal (also referred to as NACK signal) indicating the failure of the reception of the second signal, and execute a process of receiving the second signal retransmitted by the setting apparatus 200. If the wireless communication apparatus 100 has successfully received the retransmitted second signal, the processor 121 may transmit the ACK signal to the setting apparatus 200 and execute the process of inactivating the transmitting circuit after the transmission of the ACK signal.

The processor 121 causes a parameter included in the second signal to be stored in the memory 122 (in S112). Thus, data is written to the memory 122 of the wireless communication apparatus 100 based on the second signal transmitted by the setting apparatus 200. By storing the data, details of the transmission data 1222 stored in the memory 122 may be updated, for example. In this case, after the details of the transmission data 1222 are updated based on the second signal from the setting apparatus 200, the wireless communication apparatus 100 may transmit a beacon signal based on the details of the transmission data 1222 after the update.

After the wireless communication apparatus 100 has successfully received the second signal, the processor 121 inactivates the receiving circuit included in the RF circuit 126 (in S113), transmits a request to measure time to the timer circuit 125, transitions to the power saving state, and terminates the flow of the process illustrated in FIG. 5.

In the flow of the aforementioned process, if the output level of the optical sensor is in the high output state, the wireless communication apparatus 100 may operate to write data to the memory 122 based on the second signal.

Figure 6:
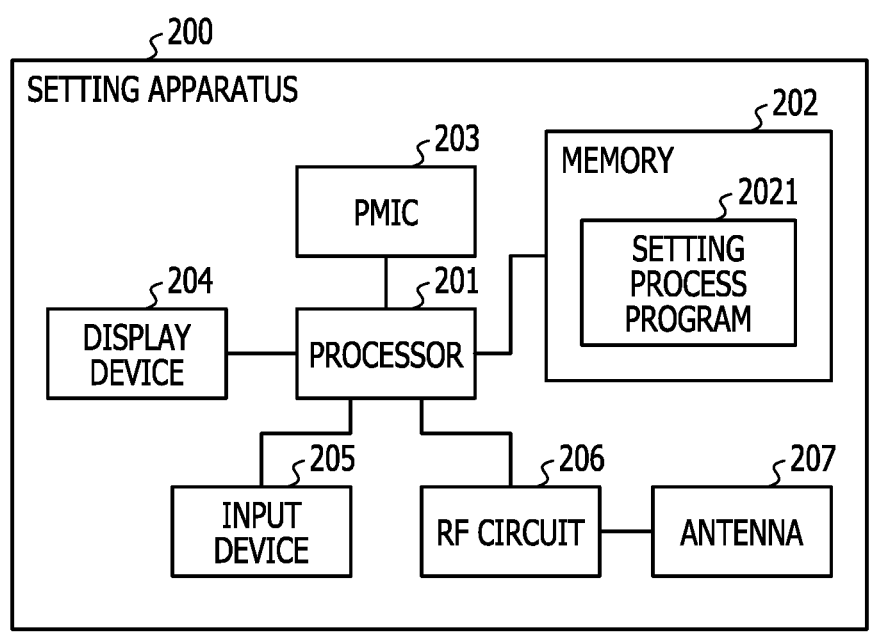
FIG. 6 is a diagram illustrating an example of a hardware configuration of a setting apparatus according to the first embodiment.

FIG. 6 is a diagram illustrating an example of a hardware configuration of the setting apparatus 200 according to the first embodiment. The setting apparatus 200 illustrated in FIG. 6 includes a processor 201, a memory 202, a PMIC 203, a display device 204, an input device 205, an RF circuit 206, and an antenna 207.

The processor 201 is configured as a hardware circuit that executes processes of the setting apparatus 200 according to the first embodiment by executing various programs including a setting process program 2021 stored in the memory 202.

The memory 202 is configured to store and hold various types of data and various programs including the setting process program 2021 to be executed by the processor 201. The memory 202 includes either or both of a nonvolatile storage device and a volatile storage device. Examples of the memory 202 are a random access memory (RAM), a read only memory (ROM), a solid state drive (SSD), and a hard disk drive (HDD).

The PMIC 203 is configured to generate, from power supplied to the setting apparatus 200, power appropriate as operational power of the processor 201 and supply the generated power to the processor 201. The PMIC 203 supplies operational power to the memory 202, the display device 204, the input device 205, and the RF circuit 206 via the processor 201. The PMIC 203 may be configured to supply the operational power directly to the memory 202, the display device 204, the input device 205, and the RF circuit 206 without causing the operational power to pass through the processor 201. In the first embodiment, a power source that supplies power to the setting apparatus 200 is not limited. The setting apparatus 200 according to the first embodiment may include a battery as the supply source for supplying the power to the setting apparatus 200 or may use a commercial power source for supplying power to the setting apparatus 200 from an external terminal of the setting apparatus 200.

The display device 204 is configured to display process results of the setting process program 2021 executed by the processor 201 and the like. Examples of the display device 204 are a liquid crystal display (LCD), an organic electroluminescence (OEL) display, and an organic light emitting diode (OLED) display.

The input device 205 is configured to receive an input operation by the worker and output an input signal based on the received input operation to the processor 201. For example, the input device 205 may be a touch panel that includes a sensor for detecting the contact of a user's finger or the contact of a pen and is configured to output, to the processor 201, an input signal including coordinate values based on the position of the contact. Alternatively, a touch panel display formed by combining the input device 205 and the display device 204 may be implemented in the setting apparatus 200.

The RF circuit 206 includes a transmitting circuit and a receiving circuit. The transmitting circuit is configured to transmit a radio signal via the antenna 207 based on an instruction from the processor 201 in accordance with a predetermined wireless communication scheme. The receiving circuit receives a radio signal via the antenna 207. The predetermined communication scheme is a near-field communication scheme such as BLE.

Figure 7:
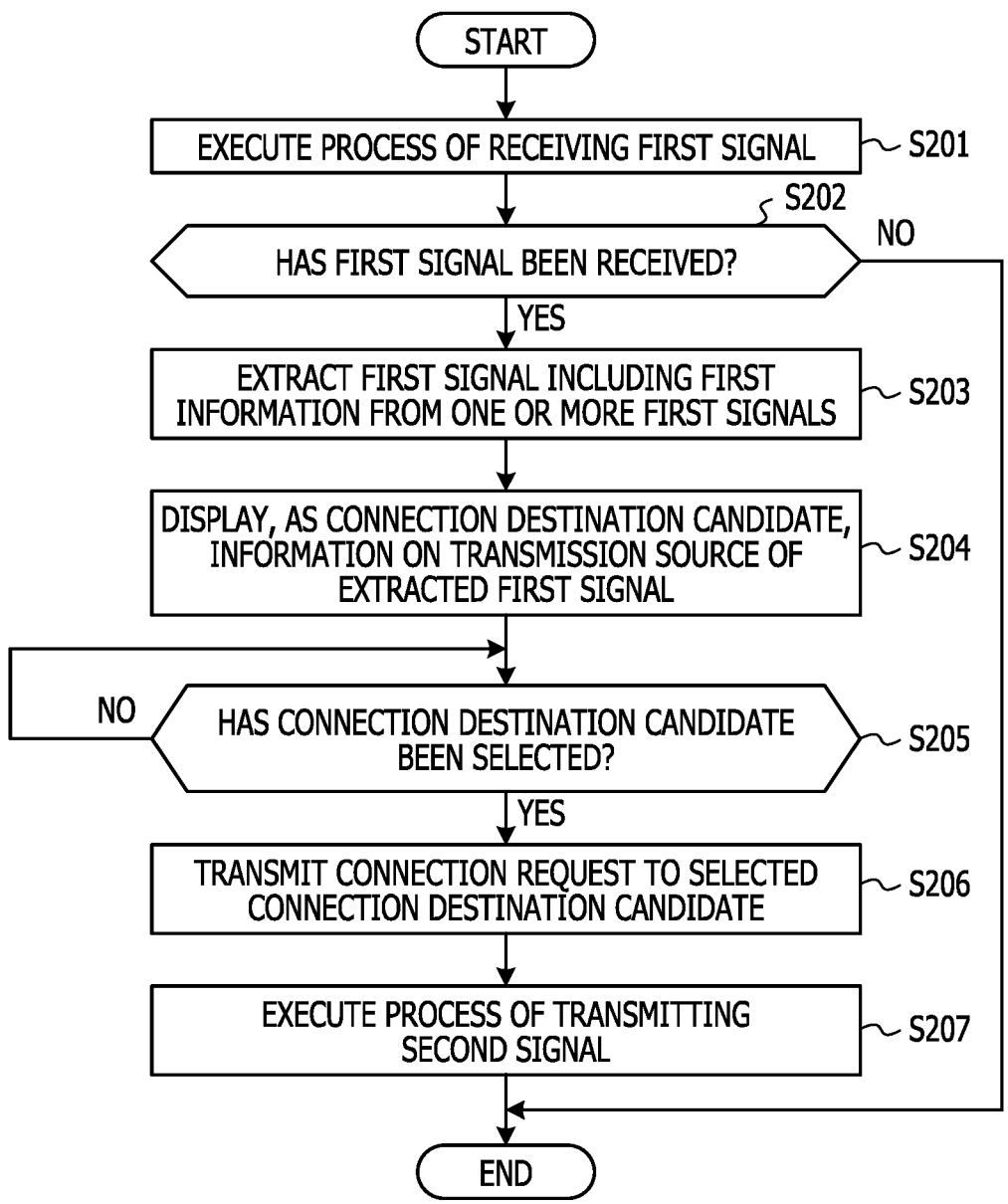
FIG. 7 is a diagram illustrating an example of the flow of a process to be executed by the setting apparatus according to the first embodiment.

FIG. 7 is a diagram illustrating an example of the flow of a process to be executed by the setting apparatus 200 according to the first embodiment. The flow of a process illustrated in FIG. 7 may be started when an input signal based on an operation of instructing to start the execution of the setting process program is input to the processor 201 from the input device 205.

The processor 201 uses the receiving circuit included in the RF circuit 206 to monitor a frequency band used for the transmission of the first signal from a wireless communication apparatus 100 and executes a process of receiving the first signal transmitted by the wireless communication apparatus 100 (in S201). If BLE is used as the wireless communication scheme, the setting apparatus 200 may monitor an advertising channel and receive an advertising packet transmitted by the wireless communication apparatus 100 in process S201. A central frequency of the advertising channel is, for example, 2402 MHz (channel index: 37), 2426 MHz (channel index: 38), or 2480 MHz (channel index 39). It is to be noted that the first signal including the first information and the first signal including the second information may be received in S201.

The processor 201 determines whether or not the setting apparatus 200 has successfully received one or more first signals (in S202). If the setting apparatus 200 has not successfully received the one or more first signals (NO in S202), the processor 201 may cause the display device 204 to display a message indicating a failure of the reception of the one or more first signals and may terminate the flow of the process illustrated in FIG. 7.

On the other hand, if the setting apparatus 200 has successfully received the one or more first signals (YES in S202), the processor 201 extracts the first signal including the first information from the one or more first signals (in S203). For example, in process S203, the processor 201 may reference Advertising Channel PDU Header of an advertising packet received in S201, and if ADV_IND (0000) is set in PDU Type (4-bit length) of the advertising packet received in S201, the processor 201 may extract the advertising packet as the first signal including the first information. On the other hand, in process S203, if ADV_NON-CONN_IND (0010) is set in PDU Type (4-bit length) of the advertising packet received in S201, the processor 201 may not extract the advertising packet.

The processor 201 acquires information on a source of the first signal from the extracted first signal and causes the display device 204 (also referred to as screen of the setting apparatus 200) to display the acquired information as a connection destination candidate (in S204). For example, in S204, the processor 201 may acquire, from Advertising Channel PDU Payload of the advertising packet received in S201, information (advertiser address (also referred to as AdvA)) to be used to identify the wireless communication apparatus 100, the name (local name), displayed in the setting apparatus 200 for the worker, of the wireless communication apparatus 100, arbitrary information (manufacture specific data) added to the wireless communication apparatus 100, transmission power (Tx power level) of the first signal, and the like.

The processor 201 waits for a signal input from the input device 205 based on an operation of selecting the connection destination candidate displayed by the display device 204 in process S204 (in S205). If the operation of selecting the connection destination candidate is not performed (NO in S205), the processor 201 may continue to wait for the operation of selecting the connection destination candidate (in S205).

On the other hand, if the processor 201 detects that the setting apparatus 200 has received the operation of selecting the connection destination candidate (YES in S205), the processor 201 transmits a connection request to the selected connection destination candidate (in S206). In process S206, the processor 201 may transmit an advertising packet (CONNECT_REQ packet) in which CONNECT_REQ (0101) is set in PDU Type (4-bit length) of Advertising Channel PDU Header.

In process S206, the processor 201 may cause the connection request to be transmitted to include information to be used to identify the setting apparatus 200, information to be used to identify the wireless communication apparatus 100 that is a connection destination, information on the timing of transmitting the second signal, and the like. For example, the processor 201 may cause Advertising Channel PDU Payload (CONNECT_REQ (also referred to as PDU Payload)) of the CONNECT_REQ packet to include a device address (also referred to as initiator address (initA)) of the setting apparatus 200, a device address (also referred to as advertiser address (AdvA)) of the wireless communication apparatus 100 that is the connection destination, the length (also referred to as transmit window size) of a time period in which the second signal may be transmitted, an offset time period (transmit window offset) from the transmission of the CONNECT_REQ packet to the start of the time period in which the second signal may be transmitted, and the like. The advertiser address may be acquired from the first signal received in process S201. The other values may be stored in the memory 202 or held in the RF circuit 206.

The processor 201 transmits, based on the transmission timing set in the connection request transmitted in process S206, the second signal including an instruction to write data to the memory 122 included in the wireless communication apparatus 100 (in S207). For example, in process S207, the processor 201 may transmit an attribute command (also referred to as ATT command) in which a write request (0x12) is set in Attribute Opcode of Attribute PDU and in which data to be written is set in Attribute Value. The aforementioned example is an example of process S207. Another item may be set in the attribute command.

In the flow of the aforementioned process, the setting apparatus 200 may transmit, to a wireless communication apparatus 100 in which the output level of an optical sensor is in the high output state, the second signal including the instruction to write the data to the memory 122 included in the wireless communication apparatus 100.

The wireless communication system 10 according to the first embodiment is described above. According to the first embodiment, only a wireless communication apparatus 100 in which the output level of an optical sensor is in the high output state writes data to the memory 122 included in the wireless communication apparatus 100 based on the second signal transmitted by the setting apparatus 200. The optical sensor 110 of the wireless communication apparatus 100 is configured so that when the optical sensor 110 is illuminated with the light 310 from the light source 300, the output level of the optical sensor 110 is in the high output state, and that when the optical sensor 110 is not illuminated with the light 310 from the light source 300, the output level of the optical sensor 110 is in the low output state. Thus, when a wireless communication apparatus 100 visually recognized by the worker as an apparatus to be changed is illuminated with the light 310 of the light source 300, the wireless communication apparatus 100 visually recognized as the apparatus to be changed may match a wireless communication apparatus 100 that writes data based on the second signal transmitted by the setting apparatus 200.

Second Embodiment

Figure 8:
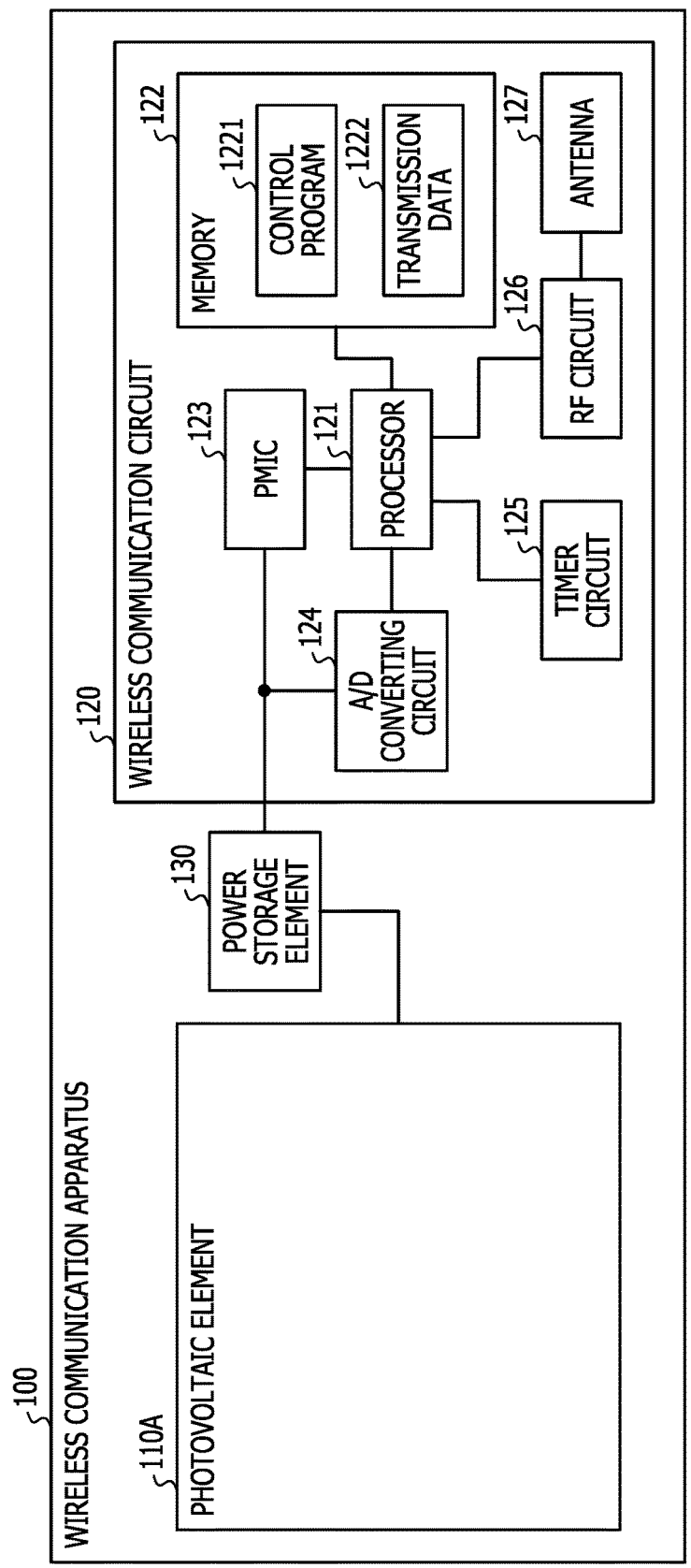
FIG. 8 is a diagram illustrating an example of a hardware configuration of a wireless communication apparatus according to a second embodiment.

FIG. 8 is a diagram illustrating an example of a hardware configuration of a wireless communication apparatus 100 according to a second embodiment. The wireless communication apparatus 100 illustrated in FIG. 8 includes a photovoltaic element 110A instead of a optical sensor 110 and includes a power storage element 130 (also referred to as capacitor) for storing power supplied from the photovoltaic element 110A.

The photovoltaic element 110A receives light and generates photovoltaic power due to a photovoltaic effect and is also referred to as solar photovoltaic element or solar battery. The photovoltaic element 110A is electrically connected to the power storage element 130 and supplies electric charges to the power storage element 130 based on the photovoltaic power generated due to the photovoltaic effect.

The power storage element 130 has a function of storing electric charges supplied from the photovoltaic element 110A and stabilizing unstable power generated by and supplied from the photovoltaic element 110A. The A/D converting circuit 124 does not directly receive output from the photovoltaic element 110A and is connected to the power storage element 130. The processor 121 may measure the quantity of electric charges stored in the power storage element 130 as a voltage value of the power storage element 130 via the A/D converting circuit 124. In other words, the processor 121 may indirectly measure the output level of the photovoltaic element 110A by measuring the voltage value of the power storage element 130.

An increase in the output level of the photovoltaic element 110A increases the quantity of electric charges to be supplied to the power storage element 130 and increases the voltage value of the power storage element 130. Since a wireless communication circuit 120 according to the second embodiment is configured to operate with power generated by and supplied from the photovoltaic element 110A, an increase in power consumed by the wireless communication circuit 120 increases the quantity of electric charges stored in and output from the power storage element 130 and reduces the voltage value of the power storage element 130. Thus, the voltage value of the power storage element 130 may change based on the relationship between the output level of the photovoltaic element 110A and the amount of power consumed by the wireless communication circuit 120.

In the example illustrated in FIG. 8, the output of the photovoltaic element 110A is supplied to the PMIC 123 of the wireless communication circuit 120 via the power storage element 130. Specifically, electric charges generated by and supplied from the photovoltaic element 110A are stored in the power storage element 130. When the wireless communication circuit 120 consumes power, electric charges stored in the power storage element 130 are supplied to the PMIC 123 of the wireless communication circuit 120.

The PMIC 123 is configured to receive power from the photovoltaic element 110A via the power storage element 130, generate power appropriate for an operation of the processor 121, and supply the operational power to the processor 121. In addition, the PMIC 123 may supply operational power to the memory 122, the A/D converting circuit 124, the timer circuit 125, and the RF circuit 126 via the processor 121. Thus, the wireless communication apparatus 100 according to the second embodiment may not include a power source that excludes the photovoltaic element 110A and the power storage element 130 and supplies power to the wireless communication circuit 120. The wireless communication apparatus 100 with this configuration may be referred to as non-battery-powered beacon apparatus.

Other features of the wireless communication apparatus 100 according to the second embodiment are the same as or similar to those of the wireless communication apparatuses 100 according to the first embodiment illustrated in FIG. 4, and a description thereof is omitted.

Figure 9:
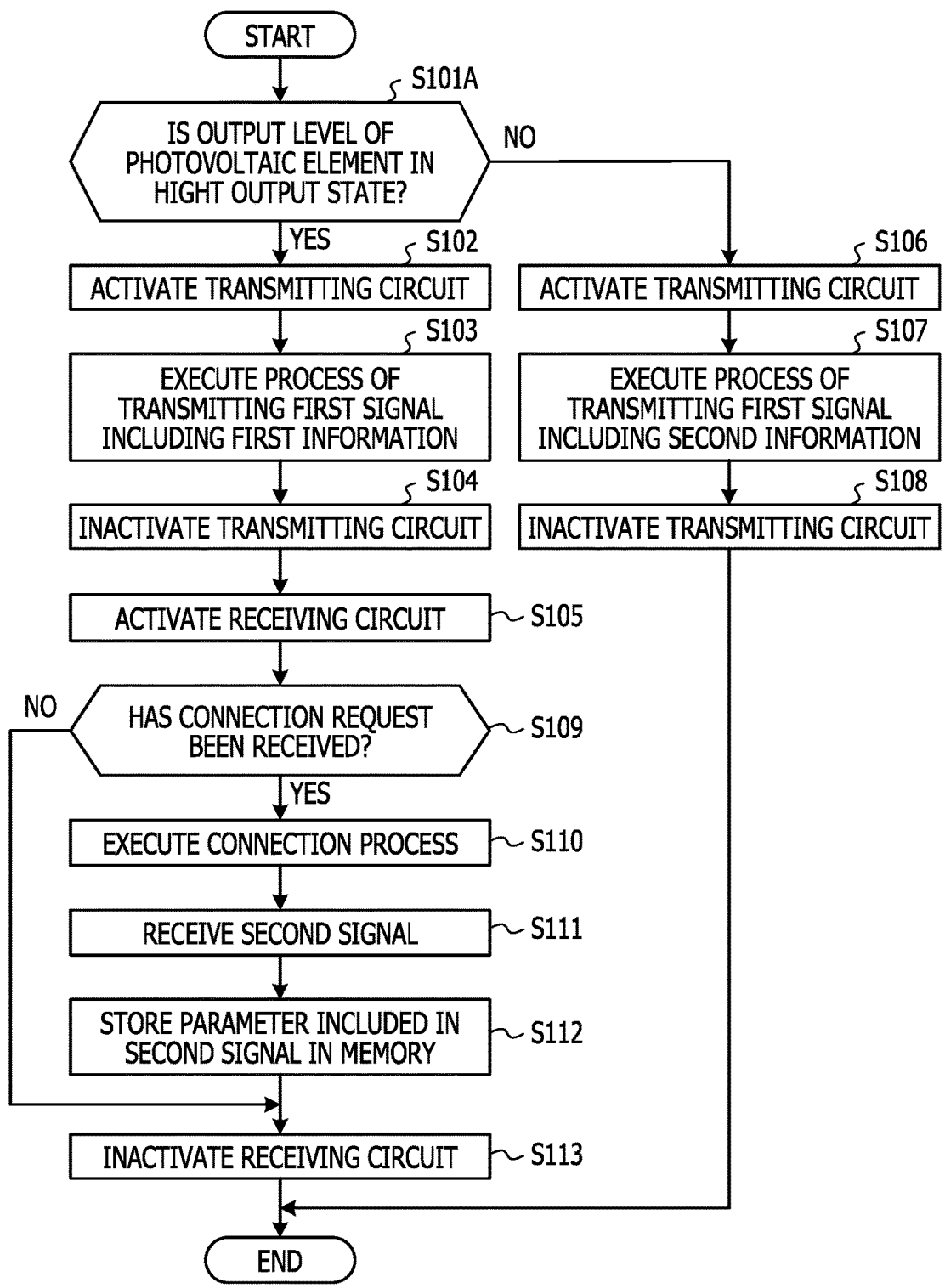
FIG. 9 is a diagram illustrating an example of the flow of a process to be executed by the wireless communication apparatus according to the second embodiment.

FIG. 9 is a diagram illustrating an example of the flow of a process to be executed by the wireless communication apparatus 100 according to the second embodiment. The flow of a process illustrated in FIG. 9 according to the second embodiment is different from the state determination process (S101) illustrated in FIG. 5 the processor 121 in that the processor 121 determines whether or not the output level of the photovoltaic element 110A as the optical sensor 110 is in the high output state (in S101A) in the process illustrated in FIG. 9. Other processes included in the process illustrated in FIG. 9 are the same as or similar to those included in the state determination process illustrated in FIG. 5, and a description thereof is omitted. In the example illustrated in FIG. 9, if the processor 121 determines that the output level of the photovoltaic element 110 is in the high output state (YES in S101A), the processor 121 activates the transmitting circuit included in the RF circuit 126 (in S102) and executes the process of transmitting the first signal including the first information (in S103). If the processor 121 determines that the output level of the photovoltaic element 110 is not in the high output state (NO in S101A), the processor 121 activates the transmitting circuit included in the RF circuit 126 (in S106) and executes the process of transmitting the first signal including the second information (in S107). The other processes included in the process illustrated in FIG. 9 are the same as or similar to those included in the process illustrated in FIG. 5 according to the first embodiment, and a description thereof is omitted.

Figure 10:
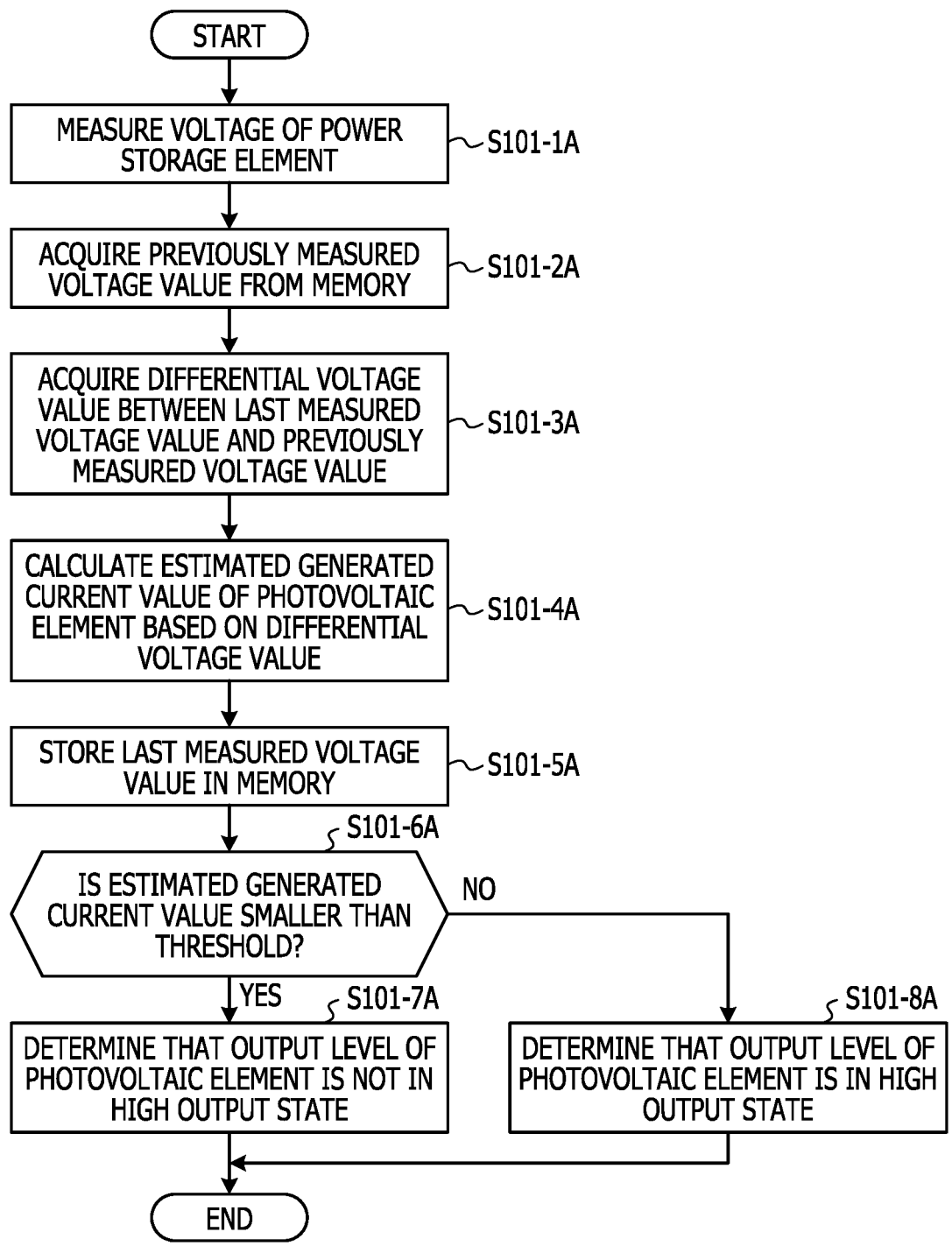
FIG. 10 is a diagram illustrating an example of the flow of a state determination process to be executed by the wireless communication apparatus according to the second embodiment.

FIG. 10 is a diagram illustrating an example of the flow of the state determination process (S101A) to be executed by the wireless communication apparatus according to the second embodiment. The processor 121 measures the voltage of the power storage element 130 via the A/D converting circuit 124 and acquires the measured voltage value (S101-1A). The processor 121 executes the process illustrated in FIG. 9 every time the processor 121 receives an interrupt signal from the timer circuit 125. Thus, the processor 121 executes process S101-1A to acquire a measured voltage value of the power storage element 130 at each of time intervals based on a timer value set in the timer circuit 125. Then, every time the processor 121 acquires a measured voltage value of the power storage element 130 at a time interval based on the timer value, the processor 121 causes the measured voltage value to be stored in the memory 122 in process S101-5A described later.

The processor 121 acquires a previously measured voltage value from the memory 122 (in S101-2A) and acquires a differential voltage value dV that is the difference between the last measured voltage value and the previously measured voltage value (in S101-3A). In process S101-3A, the processor 121 may acquire the differential voltage value dV by subtracting the previously measured voltage value from the last measured voltage value, for example.

The processor 121 calculates, based on the differential voltage value dV, an estimated generated current value that is an estimated value of a current generated by and supplied form the photovoltaic element 110A (in S101-4A). In process S101-4A, the processor 121 may calculate the estimated generated current value I using Equation (1) of $I=\{dV+(Q\_beacon/C)\}/(t/C)$, for example. In Equation (1), dV indicates the differential voltage value, Q_beacon indicates the quantity of electric charges based on power to be consumed by the wireless communication circuit 120 per unit time, C indicates the capacitance of the power storage element 130, and t indicates a time length corresponding to a time period that is based on the timer value and is from the time when the previous measurement is executed to the time when the latest measurement is executed. The electric charge quantity Q_beacon and the capacitance C are designed values. If temperature fluctuation and the like of circuit characteristics are ignored, the electric charge quantity Q_beacon and the capacitance C are determined as substantially fixed values upon the design or implementation of the circuit. It is assumed that the electric charge quantity Q_beacon and the capacitance C are stored in the memory 122. The time length t is a value defined based on the timer value set in the timer circuit 125. The timer value may be a fixed set value upon the design or may be a value dynamically set upon an operation of the wireless communication apparatus 100. It is assumed that the time length t is already stored in the memory 122 upon the execution of process S101-4A. The time length t may be equal to the timer value set in the timer circuit 125 from the processor 121 or may be a value obtained by multiplying the timer value by a predetermined coefficient.

The processor 121 causes the last measured voltage value to be stored in the memory 122 (in S101-5A) and determines whether or not the estimated generated current value I is smaller than a threshold (in S101-6A). If the processor 121 determines that the estimated generated current value I is smaller than the threshold (YES in S101-6A), the processor 121 may determine that the output level of the photovoltaic element 110A is not in the high output state (in S101-7A). If the processor 121 determines that the estimated generated current value I is equal to or larger than the threshold (NO in S101-6A), the processor 121 may determine that the output level of the photovoltaic element 110A is in the high output state (in S101-8A). The threshold may be determined as a value exceeding a normal range, estimated in an operational environment of the wireless communication apparatus 100, of the estimated generated current value of the photovoltaic element 110A. For example, the processor 121 may measure the range of the estimated generated current value, to be output, of the photovoltaic element 110A affected by environmental light in the operational environment of the wireless communication apparatus 100 and cause a value that is in the measured range and may remove an effect of the environmental light to be stored in the memory 122 of the wireless communication apparatus 100 in advance. The threshold may be adjusted based on an upper limit of the operational voltage of the power storage element 130.

In the flow of the aforementioned process, the processor 121 of the wireless communication apparatus 100 according to the second embodiment determines whether or not the output level of the photovoltaic element 110A is in the high output state.

The wireless communication apparatus 100 according to the second embodiment is described above. A setting apparatus 200 included in a wireless communication system 10 according to the second embodiment is the same as or similar to the setting apparatus 200 described in the first embodiment, and a description thereof is omitted. According to the second embodiment, only a wireless communication apparatus 100 in which the output level of a photovoltaic element 110A is in the high output state writes data to a memory 122 included in the wireless communication apparatus 100 based on the second signal transmitted by the setting apparatus 200. The photovoltaic element 110A of the wireless communication apparatus 100 is configured so that when the photovoltaic element 110A is illuminated with the light 310 from the light source 300, the output level of the photovoltaic element 110A is in the high output state, and that when the photovoltaic element 110A is not illuminated with the light 310 from the light source 300, the output level of the photovoltaic element 110A is in the low output state. Thus, when a wireless communication apparatus 100 visually recognized by the worker as an apparatus to be changed is illuminated with the light 310 of the light source 300, the wireless communication apparatus 100 visually recognized by the worker as the apparatus to be changed may match a wireless communication apparatus 100 that executes the process of writing data based on the second signal transmitted by the setting apparatus 200.

In addition, according to the second embodiment, the wireless communication circuit 120 may operate by receiving power generated by and supplied from the photovoltaic element 110A. Thus, in the wireless communication apparatus 100 that has received the light 310 from the light source 300, the wireless communication circuit 120 may stably receive high output power supplied from the photovoltaic element 110A and stably execute the process of writing data based on the second signal from the setting apparatus 200.

Third Embodiment

Figure 11:
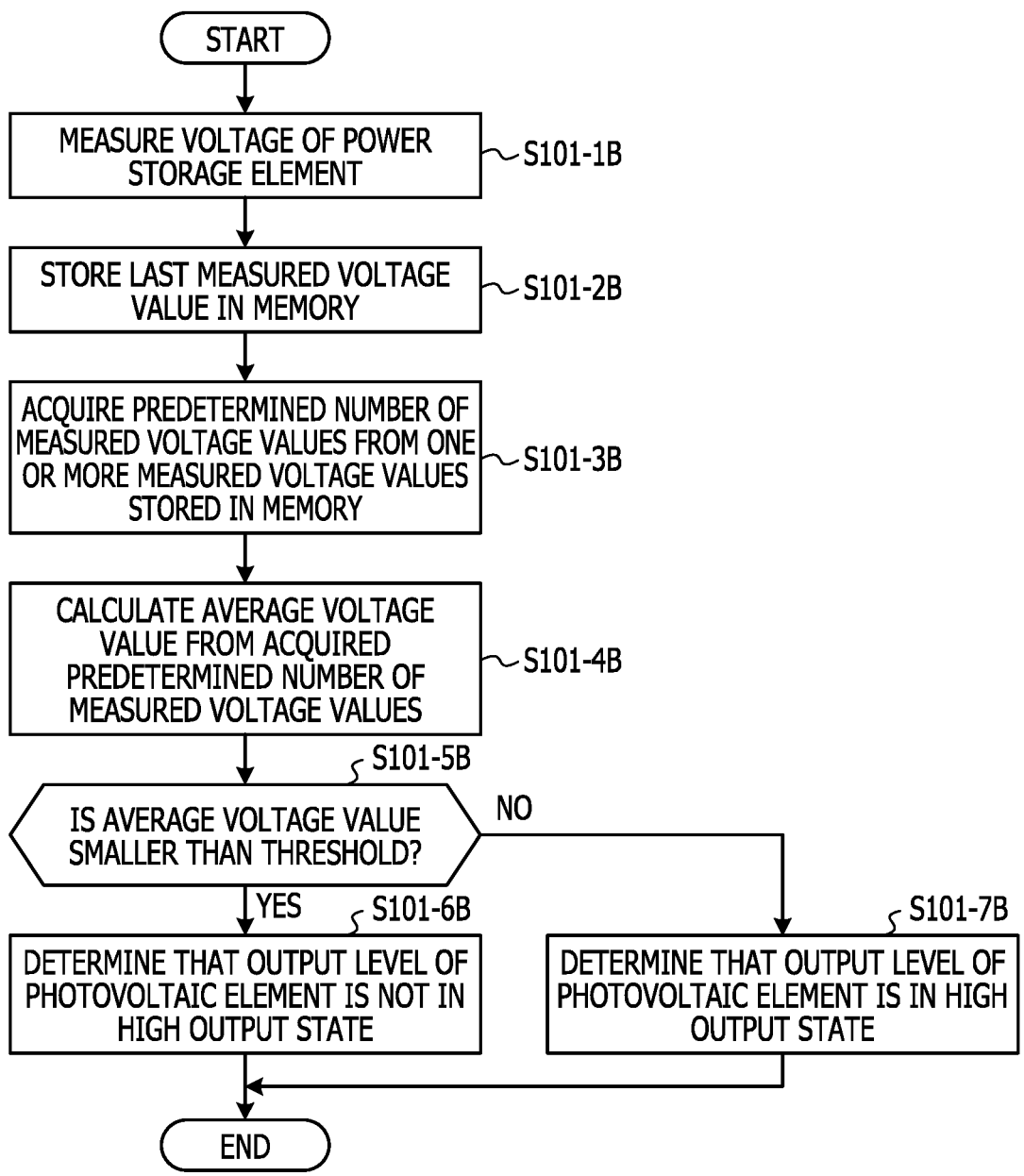
FIG. 11 is a diagram illustrating an example of the flow of a state determination process to be executed by a wireless communication apparatus according to a third embodiment.

FIG. 11 is a diagram illustrating an example of the flow of a state determination process to be executed by a wireless communication apparatus 100 according to a third embodiment. The flow of a state determination process illustrated in FIG. 11 is an example of the state determination process (S101A) illustrated in FIG. 9. Thus, other processes to be executed by the wireless communication apparatus 100 according to the third embodiment are the same as or similar to processes S102 to S113 illustrated in FIG. 9, and a description thereof is omitted. The configuration of the wireless communication apparatus 100 according to the third embodiment is the same as or similar to the configuration illustrated in FIG. 8.

The processor 121 measures the voltage of the power storage element 130 via the A/D converting circuit 124 and acquires the measured voltage value (in S101-113). Then, the processor 121 causes the last measured voltage value to be stored in the memory 122 (in S101-213). The processor 121 executes the process illustrated in FIG. 9 every time the processor 121 receives an interrupt signal from the timer circuit 125. Thus, at time intervals based on the timer value set in the timer circuit 125, the processor 121 executes processes S101-1B and S101-2B and causes acquired measured voltage values to be stored in the memory 122. In this case, the processor 121 may count the number of measured voltage values stored in the memory 122. If the number of measured voltage values stored in the memory 122 exceeds a predetermined value, the processor 121 may delete the oldest measured voltage value from the memory 122.

The processor 121 acquires a predetermined number of measured voltage values from one or more measured voltage values stored in the memory 122 (in S101-3B) and acquires an average voltage value that is the average of the acquired predetermined number of measured voltage values (in S101-413). In process S101-4B, the processor 121 may acquire the average voltage value in accordance with an arithmetic average algorithm or a weighted average algorithm. The earlier the time when a measured voltage value is acquired, the larger a coefficient to be used for the arithmetic average and to be multiplied by the measured voltage value. The earlier the time when a measured voltage value is acquired, the newer the measured voltage value among measured voltage values stored in order in the memory 122.

The processor 121 determines whether or not the average voltage value is smaller than a threshold (in S101-513). If the processor 121 determines that the average voltage value is smaller than the threshold (YES in S101-56), the processor 121 may determine that the output level of the photovoltaic element 110A is not in the high output state (in S101-6B). On the other hand, if the processor 121 determines that the average voltage value is equal to or larger than the threshold (NO in S101-56), the processor 121 may determine that the output level of the photovoltaic element 110A is in the high output state (in S101-7B). The threshold may be determined as a value exceeding a normal range, estimated in an operational environment of the wireless communication apparatus 100, of the estimated generated current value of the photovoltaic element 110A. For example, the processor 121 may measure the range of the estimated generated current value, to be output, of the photovoltaic element 110A affected by environmental light in the operational environment of the wireless communication apparatus 100 and cause a value that is in the measured range and may remove an effect of the environmental light to be stored in the memory 122. The threshold may be adjusted based on the upper limit of the operational voltage of the power storage element 130.

In the flow of the aforementioned process, the processor 121 of the wireless communication apparatus 100 according to the third embodiment determines whether or not the output level of the photovoltaic element 110A is in the high output state.

The wireless communication apparatus 100 according to the third embodiment is described above. A setting apparatus 200 included in a wireless communication system 10 according to the third embodiment is the same as or similar to the setting apparatus 200 according to the first embodiment, and a description thereof is omitted. According to the third embodiment, only a wireless communication apparatus 100 in which the output level of a photovoltaic element 110A is in the high output state writes data to a memory 122 included in the wireless communication apparatus 100 based on the second signal transmitted by the setting apparatus 200. The photovoltaic element 110A of the wireless communication apparatus 100 is configured so that when the photovoltaic element 110A is illuminated with the light 310 from the light source 300, the output level of the photovoltaic element 110A is in the high output state, and that when the photovoltaic element 110A is not illuminated with the light 310 from the light source 300, the output level of the photovoltaic element 110A is in the low output state. Thus, when a wireless communication apparatus 100 visually recognized by the worker as an apparatus to be changed is illuminated with the light 310 of the light source 300, the wireless communication apparatus 100 visually recognized by the worker as the apparatus to be changed may match a wireless communication apparatus 100 that executes the process of writing data based on the second signal transmitted by the setting apparatus 200.

According to the third embodiment, the wireless communication circuit 120 may operate by receiving power generated by and supplied from the photovoltaic element 110A. Thus, in the wireless communication apparatus 100 that has received the light 310 from the light source 300, the wireless communication circuit 120 may stably receive high output power supplied from the photovoltaic element 110A and stably execute the process of writing data based on the second signal from the setting apparatus 200.

Fourth Embodiment

Figure 12:
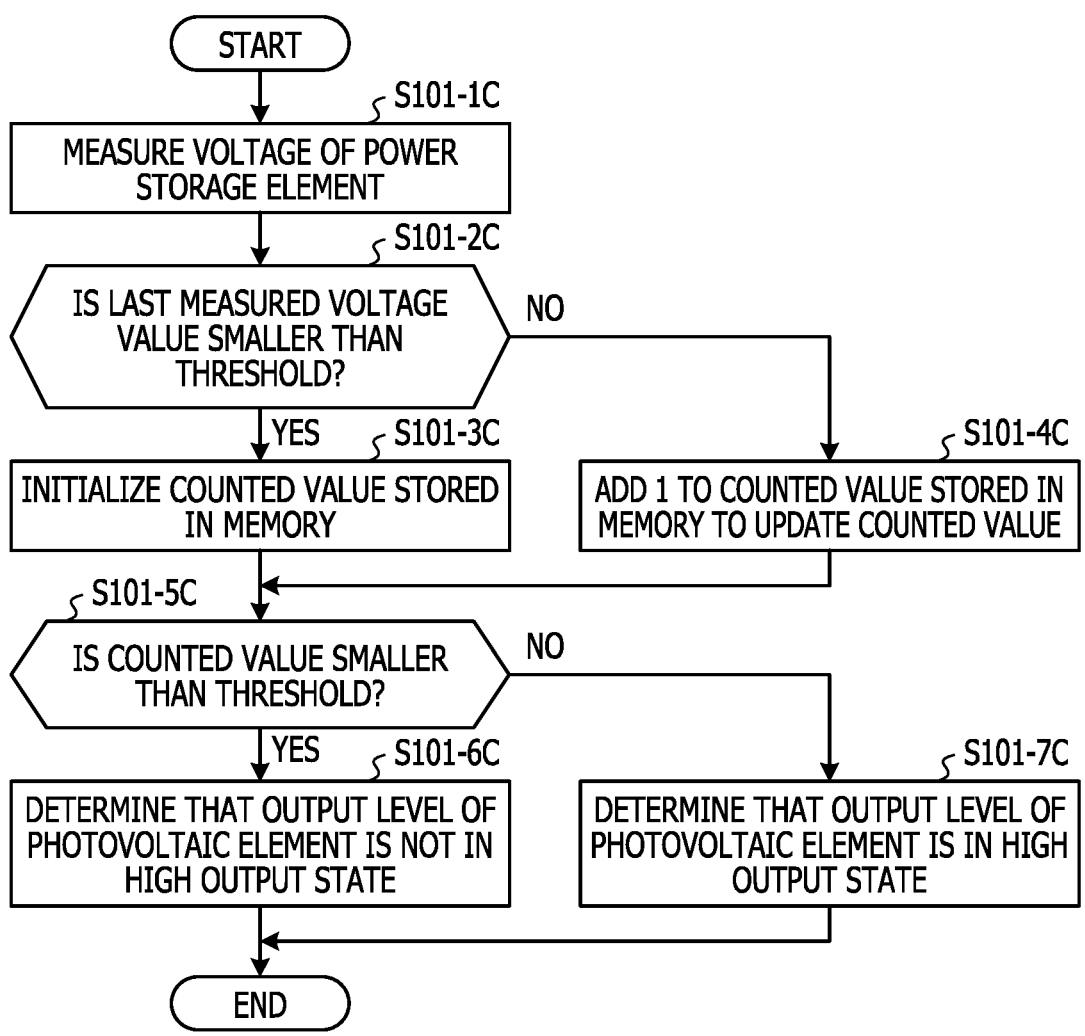
FIG. 12 is a diagram illustrating an example of the flow of a state determination process to be executed by a wireless communication apparatus according to a fourth embodiment.

FIG. 12 is a diagram illustrating an example of the flow of a state determination process to be executed by a wireless communication apparatus according to a fourth embodiment. The flow of a state determination process illustrated in FIG. 12 is an example of the state determination process (S101A) illustrated in FIG. 9. Thus, other processes to be executed by the wireless communication apparatus 100 according to the fourth embodiment are the same as or similar to processes S102 to S113 illustrated in FIG. 9, and a description thereof is omitted. In addition, the configuration of the wireless communication apparatus 100 according to the fourth embodiment is the same as or similar to the configuration illustrated in FIG. 8.

The processor 121 measures the voltage of the power storage element 130 via the A/D converting circuit 124 and acquires the measured voltage value (in S101-1C). Then, the processor 121 determines whether or not the last measured voltage value is lower than a threshold (in S101-2C). If the processor 121 determines that the last measured voltage value is lower than the threshold (YES in S101-2C), the processor 121 initializes a counted value stored in the memory 122 to 0 (in S101-3C). In process S101-3C, if the counted value is not stored in the memory 122, the processor 121 causes the initial counted value (0) to be stored in the memory 122. The threshold may be determined as a value exceeding a normal range, estimated in an operational environment of the wireless communication apparatus 100, of the estimated generated current value of the photovoltaic element 110A. For example, the processor 121 may measure a range of the estimated generated current value, to be output, of the photovoltaic element 110A affected by environmental light in the operational environment of the wireless communication apparatus 100 and cause a value that is in the measured range and may remove an effect of the environmental light to be stored in the memory 122 in advance. The threshold may be adjusted based on the upper limit of the operational voltage of the power storage element 130.

If the processor 121 determines that the last measured voltage value is equal to or larger than the threshold (NO in S101-2C), the processor 121 adds 1 to the counted value stored in the memory 122 to update the counted value (in S101-4C). Specifically, in processes S101-1C to S101-4C, the processor 121 causes the number of times that a voltage value equal to or larger than the threshold is continuously measured to be stored in the memory 122.

The processor 121 determines whether or not the counted value stored in the memory 122 is smaller than a threshold (in S101-5C). If the processor 121 determines that the counted value stored in the memory 122 is smaller than the threshold (YES in S101-5C), the processor 121 may determine that the output level of the photovoltaic element 110A is not in the high output state (in S101-6C). On the other hand, if the processor 121 determines that the counted value stored in the memory 122 is equal to or larger than the threshold (NO in S101-5C), the processor 121 may determine that the output level of the photovoltaic element 110A is in the high output state (in S101-7C). The threshold may be determined based on a continuous time period within which it is possible to determine whether the illumination of the photovoltaic element 110A with the light from the light source has been incidentally or intentionally performed.

In the flow of the aforementioned process, the processor 121 of the wireless communication apparatus 100 according to the fourth embodiment determines whether or not the output level of the photovoltaic element 110A is in the high output state.

The wireless communication apparatus 100 according to the fourth embodiment is described above. A setting apparatus 200 included in a wireless communication system 10 according to the fourth embodiment is the same as or similar to the setting apparatus 200 described in the first embodiment, and a description thereof is omitted. According to the fourth embodiment, only a wireless communication apparatus 100 in which the output level of a photovoltaic element 110A is in the high output state writes data to a memory 122 included in the wireless communication apparatus 100 based on the second signal transmitted by the setting apparatus 200. The photovoltaic element 110A of the wireless communication apparatus 100 is configured so that when the photovoltaic element 110A is illuminated with the light 310 from the light source 300, the output level of the photovoltaic element 110A is in the high output state, and that when the photovoltaic element 110A is not illuminated with the light 310 from the light source 300, the output level of the photovoltaic element 110A is in the low output state. Thus, when a wireless communication apparatus 100 visually recognized by the worker as an apparatus to be changed is illuminated with the light 310 of the light source 300, the wireless communication apparatus 100 visually recognized by the worker as the apparatus to be changed may match a wireless communication apparatus 100 that executes the process of writing data based on the second signal transmitted by the setting apparatus 200.

According to the fourth embodiment, the wireless communication circuit 120 may operate by receiving power generated by and supplied from the photovoltaic element 110A. Thus, in the wireless communication apparatus 100 that has received the light 310 from the light source 300, the wireless communication circuit 120 may stably receive high output power supplied from the photovoltaic element 110A and stably execute the process of writing data based on the second signal from the setting apparatus 200.

Fifth Embodiment

Figure 13:
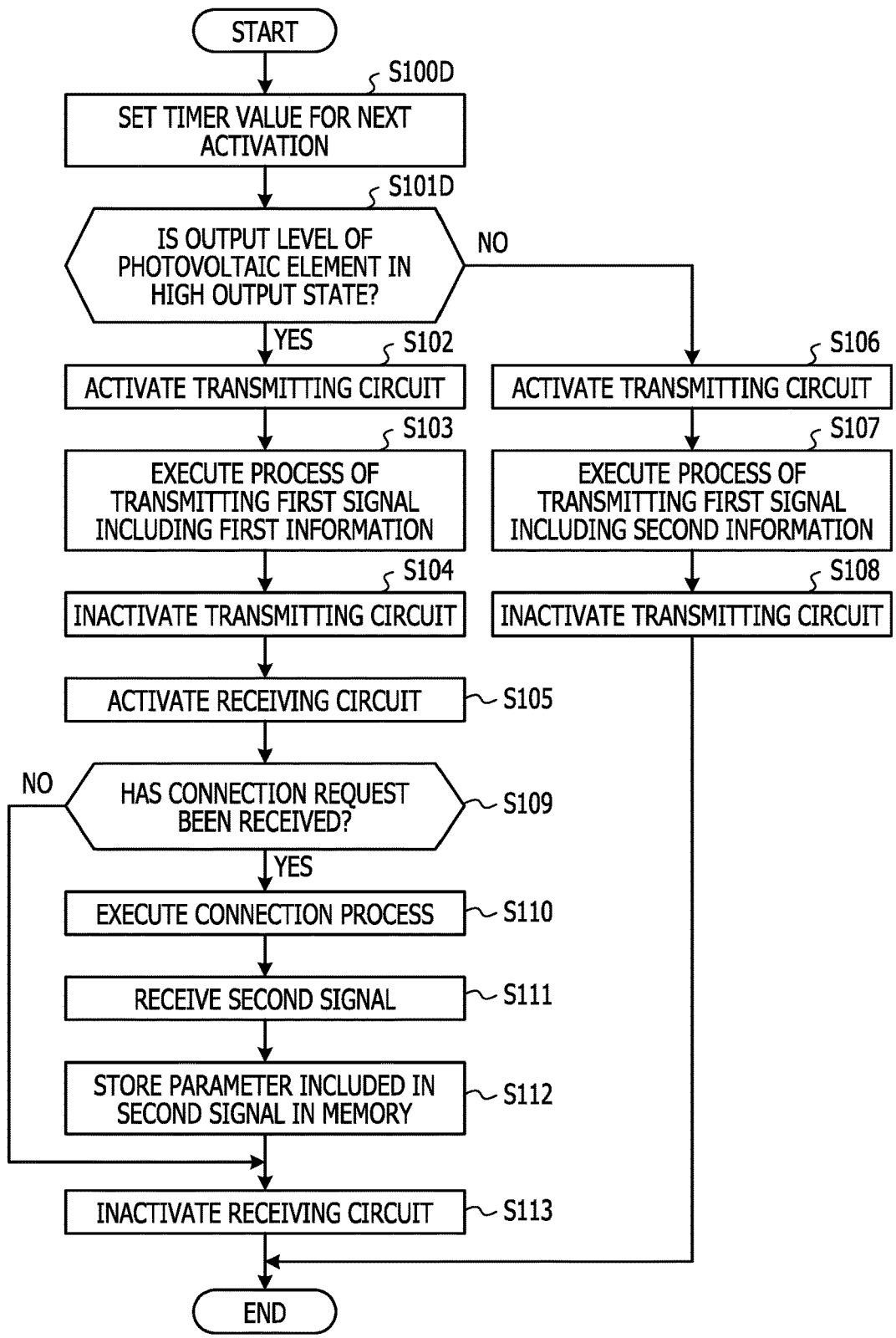
FIG. 13 is a diagram illustrating an example of the flow of a process to be executed by a wireless communication apparatus according to a fifth embodiment.

FIG. 13 is a diagram illustrating an example of the flow of a process to be executed by a wireless communication apparatus according to a fifth embodiment. The flow of a process illustrated in FIG. 13 according to the fifth embodiment includes a process (S100D) of setting the timer value and a state determination process (S101D). Other processes included in the process illustrated in FIG. 13 are the same as or similar to those included in the process illustrated in FIG. 9, and a description thereof is omitted. In addition, the configuration of the wireless communication apparatus 100 according to the fifth embodiment is the same as or similar to the configuration illustrated in FIG. 8.

Figure 14:
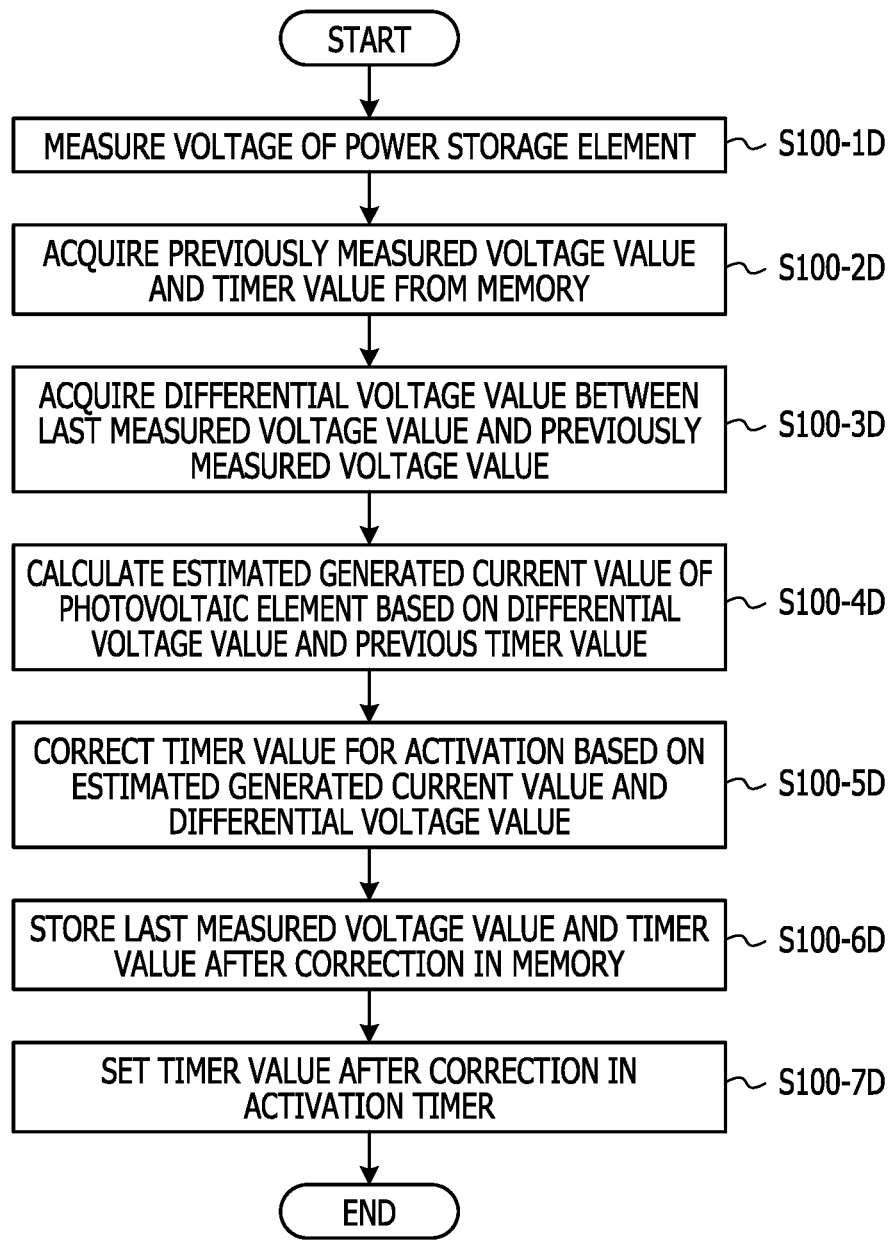
FIG. 14 is a diagram illustrating an example of the flow of a process of setting a timer value by the wireless communication apparatus according to the fifth embodiment.

FIG. 14 is a diagram illustrating an example of the flow of the process (S100D) of setting the timer value by the wireless communication apparatus according to the fifth embodiment. Every time an interrupt signal (activation instruction) is input to the processor 121 from the timer circuit 125, the flow of the process (S100D), illustrated in FIG. 14, of setting the timer value is executed, like the flow of the process illustrated in FIG. 13 according to the fifth embodiment.

The processor 121 measures the voltage of the power storage element 130 via the A/D converting circuit 124 and acquires the measured voltage value (in S100-1D). As described above, the processor 121 executes the process illustrated in FIG. 13 every time the processor 121 receives an interrupt signal from the timer circuit 125. Thus, the processor 121 executes process S100D and acquires a measured voltage value of the power storage element 130 at each of time intervals based on the timer value set in the timer circuit 125. Every time the processor 121 acquires a measured voltage value of the power storage element 130 at a time interval based on the timer value, the processor 121 causes the measured voltage value to be stored in the memory 122 in process S100-6D described later. In this case, the processor 121 causes the timer value after correction to be stored in the memory 122. As a result, upon the second and later execution of the process (S100D), illustrated in FIG. 14, of setting the timer value, a previously measured voltage value and the previously set timer value after the correction are stored in the memory 122.

The processor 121 acquires the previously measured voltage value and the timer value from the memory 122 (in S100-2D) and acquires a differential voltage value dV that is the difference between the last measured voltage value and the previously measured voltage value (in S100-3D). In process S100-3D, the processor 121 may acquire the differential voltage value dV by subtracting the previously measured voltage value from the last measured voltage value, for example.

The processor 121 calculates, based on the differential voltage value dV, an estimated generated current value that is an estimated value of a current generated by and supplied from the photovoltaic element 110A (S100-4D). In process S100-4D, the processor 121 may calculate the estimated generated current value using Equation (2) of $I=\{dV+(Q\_beacon/C)\}/(t0/C)$. In Equation (2), dV indicates the differential voltage value, Q_beacon indicates the quantity of electric charges based on power to be consumed by the wireless communication circuit 120 per unit time, C indicates the capacitance of the power storage element 130, and t0 indicates a time length corresponding to a time period that is based on the timer value and is from the time when the previous measurement is executed to the time when the latest measurement is executed. The electric charge quantity Q_beacon and the capacitance C are designed values. If temperature fluctuation and the like of circuit characteristics are ignored, the electric charge quantity Q_beacon and the capacitance C are determined as substantially fixed values upon the design or implementation of the circuit. It is assumed that the electric charge quantity Q_beacon and the capacitance C are stored in the memory 122. The time length t0 is a value defined based on the timer value set in the timer circuit 125. The timer value is dynamically set upon an operation of the wireless communication apparatus 100. As described above, the timer value is stored in the memory 122 upon the second and later execution of process S100D. The time length t0 may be equal to the timer value set in the timer circuit 125 from the processor 121 or may be a value obtained by multiplying the timer value by a predetermined coefficient.

The processor 121 corrects the timer value for activation based on the estimated generated current value I and the differential voltage value dV and acquires the timer value t1 after the correction (S100-5D). In process S100-5D, the processor 121 may calculate the timer value t1 after the correction using Equation (3) of $t1=[\{dV+(Q\_beacon/C)\}/(I/C)]+\{-A^*(v-v0)\}$. In Equation (3), dV indicates the differential voltage value, Q_beacon indicates the quantity of electric charges based on power to be consumed by the wireless communication circuit 120 per unit time, C indicates the capacitance of the power storage element 130, I indicates the estimated generated current value, v indicates the last measured voltage value, v0 indicates the optimal operational voltage (also referred to as target voltage value) of the wireless communication circuit 120, and A indicates a state retention coefficient. The electric charge quantity Q_beacon, the capacitance C, and the target voltage value v0 are designed values. If temperature fluctuation and the like of circuit characteristics are ignored, the electric charge quantity Q_beacon, the capacitance C, and the target voltage value v0 are determined as substantially fixed values upon the design or implementation of the circuit. It is assumed that the electric charge quantity Q_beacon, the capacitance C, and the target voltage value are stored in the memory 122. The first item of Equation (3) or $[\{dV+(Q\_beacon/C)\}/(I/C)]$ indicates an operation time interval during which the differential voltage value dV is 0. The second item of Equation (3) or $\{-A^*(v-v0)\}$ indicates that the timer value is increased or reduced based on the difference between the last measured voltage value v and the target voltage value v0. The state retention coefficient A defines a value by which the timer value is reduced or increased. The state retention coefficient A may be 1, for example.

The processor 121 causes the last measured voltage value v and the timer value t1 after the correction to be stored in the memory 122 (in S100-6D) and sets the timer value t1 after the correction in the timer circuit 125 serving as an activation timer (in S100-7D). At this time, the processor 121 may not input a request to count time to the timer circuit 125 and may not transition to a stopped state.

In the flow of the aforementioned process, the processor 121 of the wireless communication apparatus 100 according to the fifth embodiment may correct the timer value to be set in the timer circuit 125 so that a measured voltage value of the power storage element 130 becomes close to the target voltage value.

Since the wireless communication circuit 120 according to the fifth embodiment is configured to operate with power generated by and supplied from the photovoltaic element 110A, an increase in power consumed by the wireless communication circuit 120 increases the quantity of electric charges stored in and output from the power storage element 130 and reduces the voltage value of the power storage element 130. An increase in the timer value and an increase in a time period for the activation of the wireless communication circuit 120 increase a time period for a stopped state of the wireless communication circuit 120. Thus, the increase in the timer value reduces the quantity of electric charges stored in and output from the power storage element 130 and suppresses a reduction in the voltage value of the power storage element 130. Thus, if a measured voltage value of the power storage element 130 is lower than the target voltage value, the processor 121 may increase the timer value to suppress the quantity of electric charges output from the power storage element 130 and prioritize a charging effect of storing electric charges generated by and supplied from the photovoltaic element 110A in the power storage element 130.

Figure 15:
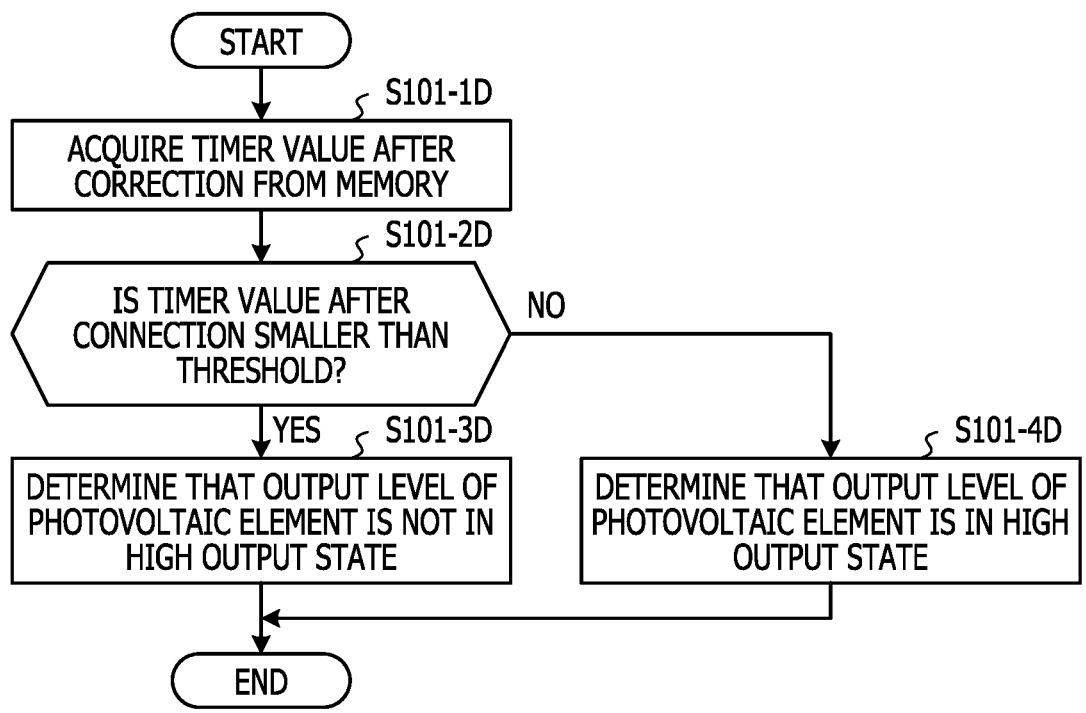
FIG. 15 is a diagram illustrating an example of the flow of a state determination process to be executed by the wireless communication apparatus according to the fifth embodiment.

FIG. 15 is a diagram illustrating an example of the flow of the state determination process (S101D) to be executed by the wireless communication apparatus 100 according to the fifth embodiment. The processor 121 acquires the timer value t1 after the correction from the memory 122 (in S101-1D) and determines whether or not the timer value t1 after the correction is smaller than a threshold (in S101-2D). If the processor 121 determines that the timer value t1 after the correction is smaller than the threshold (YES in S101-2D), the processor 121 determines that the output level of the photovoltaic element 110A is not in the high output state (in S101-3D). On the other hand, if the processor 121 determines that the timer value t1 after the correction is equal to or larger than the threshold (NO in S101-2D), the processor 121 determines that the output level of the photovoltaic element 110A is in the high output state (in S101-4D).

In the flow of the aforementioned process, the processor 121 of the wireless communication apparatus 100 according to the fifth embodiment determines whether or not the output level of the photovoltaic element 110A is in the high output state.

The wireless communication apparatus 100 according to the fifth embodiment is described above. A setting apparatus 200 included in a wireless communication system 10 according to the fifth embodiment is the same as or similar to the setting apparatus 200 described in the first embodiment, and a description thereof is omitted. According to the fifth embodiment, only a wireless communication apparatus 100 in which the output level of a photovoltaic element 110A is in the high output state writes data to a memory 122 included in the wireless communication apparatus 100 based on the second signal transmitted by the setting apparatus 200. The photovoltaic element 110A of the wireless communication apparatus 100 is configured so that when the photovoltaic element 110A is illuminated with the light 310 from the light source 300, the output level of the photovoltaic element 110A is in the high output state, and that when the photovoltaic element 110A is not illuminated with the light 310 from the light source 300, the output level of the photovoltaic element 110A is in the low output state. Thus, when a wireless communication apparatus 100 visually recognized by the worker as an apparatus to be changed is illuminated with the light 310 of the light source 300, the wireless communication apparatus 100 visually recognized by the worker as the apparatus to be changed may match a wireless communication apparatus 100 that executes the process of writing data based on the second signal transmitted by the setting apparatus 200.

According to the fifth embodiment, the wireless communication circuit 120 may operate by receiving power generated by and supplied from the photovoltaic element 110A. Thus, in the wireless communication apparatus 100 that has received the light 310 from the light source 300, the wireless communication circuit 120 may stably receive high output power supplied from the photovoltaic element 110A and stably execute the process of writing data based on the second signal from the setting apparatus 200.

Sixth Embodiment

Figure 16:
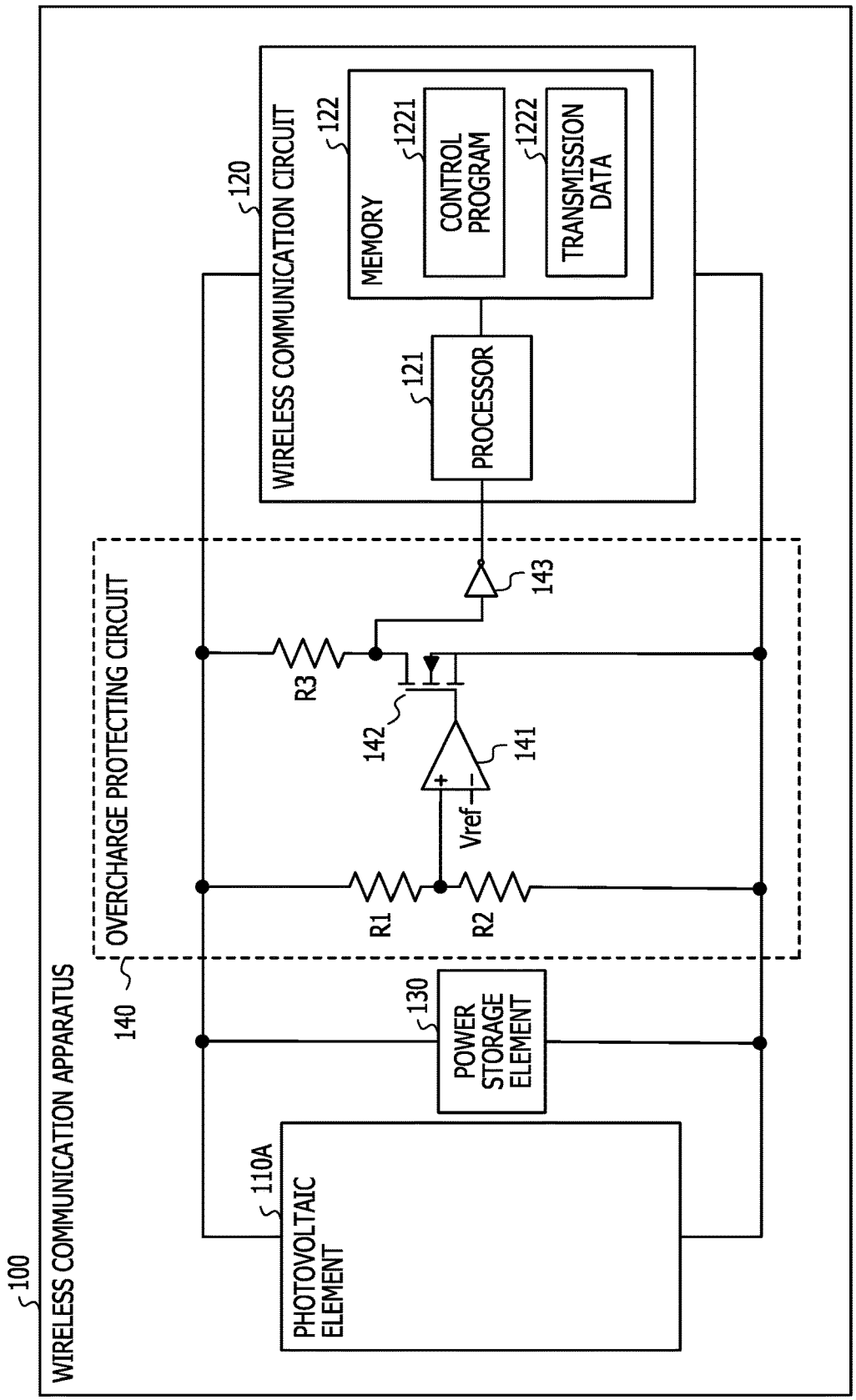
FIG. 16 is a diagram illustrating an example of a hardware configuration of a wireless communication apparatus according to a sixth embodiment.

FIG. 16 is a diagram illustrating an example of a hardware configuration of a wireless communication apparatus 100 according to a sixth embodiment. A wireless communication apparatus 100 illustrated in FIG. 16 is different from the configuration illustrated in FIG. 8 in that the wireless communication apparatus 100 illustrated in FIG. 16 includes an overcharge protecting circuit 140 and does not include the A/D converting circuit 124. Other features of the wireless communication apparatus 100 illustrated in FIG. 16 are the same as or similar to those of the configuration illustrated in FIG. 8, and a description thereof is omitted. In FIG. 16, it is to be noted that an illustration of the PMIC 123, timer circuit 125, RF circuit 126, and antenna 127 of the wireless communication circuit 120 is omitted in order to simplify the following description.

The overcharge protecting circuit 140 illustrated in FIG. 16 is configured to inhibit the power storage element 130 from being overcharged. The overcharge protecting circuit 140 is configured to activate a function of inhibiting the power storage element 130 from being overcharged if the operational voltage of the power storage element 130 exceeds the upper limit set in advance. The overcharge protecting circuit 140 is also configured to supply, to the processor 121 of the wireless communication circuit 120, a signal to determine whether or not the function of inhibiting the power storage element 130 from being overcharged is being activated. In the example illustrated in FIG. 16, the overcharge protecting circuit 140 includes a comparing circuit 141, a switching circuit 142, an inverter circuit 143, a resistance element R1, a resistance element R2, and a resistance element R3. It is to be noted that the overcharge protecting circuit 140 illustrated in FIG. 16 is an example of an overcharge protecting circuit disclosed herein and that the configuration of the overcharge protecting circuit 140 illustrated in FIG. 16 may be changed within the gist of the present disclosure.

The comparing circuit 141 is configured to output a signal Vb of a high (H) logical level if a voltage Va of the power storage element 130 that is divided by the resistance elements R1 and R2 is equal to or higher than a reference voltage Vref. The comparing circuit 141 is configured to output a signal Vb of a low (L) logical level if the voltage Va is lower than the reference voltage Vref.

The reference voltage Vref may be determined based on the upper limit of the operational voltage of the power storage element 130. For example, if the operational voltage of the power storage element 130 is in a range of 2.0V to 3.6V, a value based on a voltage value obtained by dividing the upper limit of 3.6V by the resistance elements R1 and R2 may be set as the reference voltage Vref.

The switching circuit 142 is, for example, an n-channel metal-oxide semiconductor field effect transistor (MOSFET). For example, a gate terminal of the switching circuit 142 is connected to an output terminal of the comparing circuit 141, a drain terminal of the switching circuit 142 is connected to the resistance element R3, and a source terminal of the switching circuit 142 is connected to a wiring located on the side of the ground.

The inverter circuit 143 is configured to output a signal of the L level upon receiving an input signal of the H level and output a signal of the H level upon receiving an input signal of the L level. An input terminal of the inverter circuit 143 is connected to a wiring branched between the switching circuit 142 and the resistance element R3, and an output terminal of the inverter circuit 143 is connected to any of input terminals of the processor 121 of the wireless communication circuit 120.

In the example illustrated in FIG. 16, if the voltage of the power storage element 130 exceeds the upper limit of the operational voltage, a signal of the H level is output from the comparing circuit 141. In the case where the signal output from the comparing circuit 141 is at the H level, a resistance value between the drain terminal and the source terminal is reduced or the switching circuit 142 goes into a so-called ON state (also referred to as short state). If the switching circuit 142 is in the ON state, a current supplied from the power storage element 130 or the photovoltaic element 110A easily flows from the drain terminal of the switching circuit 142 to the source terminal of the switching circuit 142 via the resistance element R3. As a result, power consumption by the resistance element R3 inhibits the power storage element 130 from being overcharged.

On the other hand, if the voltage of the power storage element 130 is lower than the upper limit of the operational voltage, a signal of the L level is output from the comparing circuit 141. In the case where the signal output from the comparing circuit 141 is at the L level, the resistance value between the drain terminal and the source terminal increases, and the switching circuit 142 goes into a so-called OFF state (also referred to as open state). If the switching circuit 142 is in the OFF state, the current supplied from the power storage element 130 or the photovoltaic element 110A hardly flows between the drain terminal of the switching circuit 142 and the source terminal of the switching circuit 142, and power consumed by the resistance element R3 is reduced to a value that may be ignored.

In the example illustrated in FIG. 16, if the voltage of the power storage element 130 exceeds the upper limit of the operational voltage, the switching circuit 142 is in the ON state, and the input terminal of the inverter circuit 143 is at the L level. As a result, the inverter circuit 143 inputs the output signal of the H level to the processor 121.

On the other hand, if the voltage of the power storage element 130 is lower than the upper limit of the operational voltage, the switching circuit 142 is in the OFF state, and the input terminal of the inverter circuit 143 is at the H level. As a result, the inverter circuit 143 inputs the output signal of the L level to the processor 121.

According to the aforementioned configuration, the processor 121 detects the signal of the H level from the inverter circuit 143 of the overcharge protecting circuit 140, thereby determining that the voltage of the power storage element 130 has reached the upper limit of the operational voltage. One of reasons why the voltage of the power storage element 130 reaches the upper limit is that the output level of the photovoltaic element 110A is continuously in the high output state. Thus, the processor 121 detects the signal of the H level from the inverter circuit 143 of the overcharge protecting circuit 140, thereby indirectly determining that the output level of the photovoltaic element 110A is in the high output state.

Figure 17:
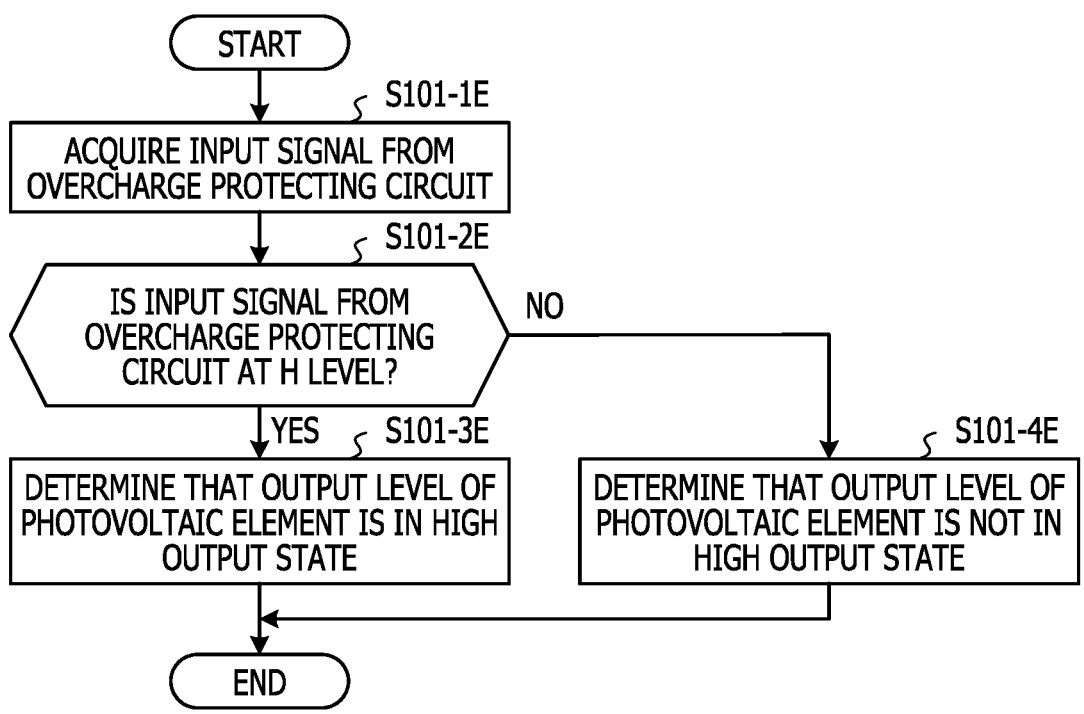
FIG. 17 is a diagram illustrating an example of the flow of a state determination process to be executed by the wireless communication apparatus according to the sixth embodiment.

FIG. 17 is a diagram illustrating an example of the flow of a state determination process to be executed by the wireless communication apparatus 100 according to the sixth embodiment. The flow of a state determination process illustrated in FIG. 17 is an example of the state determination process (S101A) illustrated in FIG. 9. Thus, other processes to be executed by the wireless communication apparatus 100 according to the sixth embodiment are the same as or similar to processes S102 to S113 illustrated in FIG. 9, and a description thereof is omitted.

The processor 121 acquires an input signal from the inverter circuit 143 of the overcharge protecting circuit 140 (in S101-1E) and determines whether or not the input signal acquired from the overcharge protecting circuit 140 is at the H level (in S101-2E). If the processor 121 determines that the input signal is at the H level (YES in S101-2E), the processor 121 may determine that the output level of the photovoltaic element 110A is in the high output state (in S101-3E).

On the other hand, if the processor 121 determines that the input signal is at the L level (NO in S101-2E), the processor 121 may determine that the output level of the photovoltaic element 110A is not in the high output state (in S101-4E).

In the flow of the aforementioned process, the processor 121 of the wireless communication apparatus 100 according to the sixth embodiment determines whether or not the output level of the photovoltaic element 110A is in the high output state.

The wireless communication apparatus 100 according to the sixth embodiment is described above. A setting apparatus 200 included in a wireless communication system 10 according to the sixth embodiment is the same as or similar to the setting apparatus 200 described in the first embodiment, and a description thereof is omitted. According to the sixth embodiment, only a wireless communication apparatus 100 in which the output level of a photovoltaic element 110A is in the high output state writes data to a memory 122 included in the wireless communication apparatus 100 based on the second signal transmitted by the setting apparatus 200. The photovoltaic element 110A of the wireless communication apparatus 100 is configured so that when the photovoltaic element 110A is illuminated with the light 310 from the light source 300, the output level of the photovoltaic element 110A is in the high output state, and that when the photovoltaic element 110A is not illuminated with the light 310 from the light source 300, the output level of the photovoltaic element 110A is in the low output state. Thus, when a wireless communication apparatus 100 visually recognized by the worker as an apparatus to be changed is illuminated with the light 310 of the light source 300, the wireless communication apparatus 100 visually recognized by the worker as the apparatus to be changed may match a wireless communication apparatus 100 that executes the process of writing data based on the second signal transmitted by the setting apparatus 200.

According to the sixth embodiment, the wireless communication circuit 120 may operate by receiving power generated by and supplied from the photovoltaic element 110A. Thus, in the wireless communication apparatus 100 that has received the light 310 from the light source 300, the wireless communication circuit 120 may stably receive high output power supplied from the photovoltaic element 110A and stably execute the process of writing data based on the second signal from the setting apparatus 200.

According to the sixth embodiment, in the wireless communication circuit 120, the A/D converting circuit 124 is not used to determine the state of the photovoltaic element 110A. Thus, in the wireless communication circuit 120, the A/D converting circuit 124 may not be implemented or may be used for another purpose.

Modified Example

The third embodiment describes the example in which the state of the photovoltaic element 110A is determined by calculating the average voltage value from the predetermined number of measured voltage values and comparing the average voltage value with the threshold. The disclosure, however, is not limited to this. For example, the predetermined number of measured voltage values may be compared with the threshold, a measured voltage value that is equal to or larger than the threshold may be converted to the H level, and a measured voltage value that is smaller than the threshold may be converted to the L level. The threshold may be determined as a value exceeding a normal range, estimated in an operational environment of the wireless communication apparatus 100, of a measured voltage value of the power storage element 130. For example, the processor 121 may measure the voltage of the power storage element 130 that has received the supply of power output from the photovoltaic element 110A affected by environmental light in the operational environment of the wireless communication apparatus 100 and cause a value that exceeds the range of measured voltage values to be stored in the memory 122 of the wireless communication apparatus 100. In other words, the value that may remove an effect of the environmental light estimated in the operational environment of the wireless communication apparatus 100 may be set as the threshold.

Then, the state of the photovoltaic element 110A may be determined by determining whether or not a pattern (also referred to as measured pattern) of values (each of which is the H level or the L level) obtained by converting measured voltage values stored in order in the memory 122 matches a predetermined pattern (also referred to as set pattern) set in the memory 122 in advance. In this case, dynamic programming (DP) matching of the measured pattern and the set pattern may be executed to obtain likelihood, and if the obtained likelihood is equal to or larger than a threshold, the processor 121 may determine that the output level of the photovoltaic element 110A is in the high output state.

According to the aforementioned modified example, by turning on and off the light 310 that is output from the light source 300 and with which a wireless communication apparatus 100 to be changed is illuminated, a measured pattern that matches the predetermined pattern may be detected by only a processor 121 included in the wireless communication apparatus 100 to be changed, for example. This may inhibit data of the wireless communication apparatus 100 from being invalidly changed by a third party that does not know the predetermined pattern.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
an optical sensor; and
a wireless communication circuit configured to execute a transmission process that transmits a first signal based on data stored in a storage element and a reception process that receives a second signal in response to the transmission of the first signal,
wherein the wireless communication circuit is further configured to write data to the storage element in accordance with the second signal received in the reception process when an output level of the optical sensor is in a first state in which the output level of the optical sensor is equal to or higher than a predetermined threshold.

2. The wireless communication apparatus according to claim 1,
wherein the wireless communication circuit is configured to
transmit the first signal including first information indicating that a connection request is allowed when the output level of the optical sensor is in the first state, and
transmit the first signal including second information indicating that the connection request is not allowed when the output level of the optical sensor is not in the first state.

3. The wireless communication apparatus according to claim 1,
wherein the wireless communication circuit is further configured to
intermittently execute the transmission process for transmitting the first signal,
execute the reception process for receiving the second signal in a time period between a first transmission time period for a transmission of the first signal and a second transmission time period for a transmission of the first signal when the output level of the optical sensor is in the first state, and
stop executing the reception process for receiving the second signal when the output level of the optical sensor is not in the first state.

4. The wireless communication apparatus according to claim 1, further comprising:
a power storage element,
wherein the optical sensor is a photovoltaic element configured to receive light and supply electric charges to the power storage element, and
wherein the wireless communication circuit is configured to operate by receiving electric charges supplied from the power storage element.

5. The wireless communication apparatus according to claim 4,
wherein the wireless communication circuit is further configured to
measure the voltage of the power storage element and acquire the measured voltage value, and
determine, based on the measured voltage value, whether or not an output level of the photovoltaic element is in the first state.

6. The wireless communication apparatus according to claim 4, wherein the wireless communication circuit is further configured to intermittently execute the transmission process for transmitting the first signal, measure the voltage of the power storage element and acquire measured voltage values of the power storage element upon the execution of the transmission process, acquire an estimated generated current value of the photovoltaic element based on a differential voltage value between the last measured voltage value and the previously measured voltage value, and determine, based on the estimated generated current value, whether or not the output level of the photovoltaic element is in the first state.

7. The wireless communication apparatus according to claim 4, wherein the wireless communication circuit is further configured to intermittently execute the transmission process for transmitting the first signal, measure the voltage of the power storage element and acquire measured voltage values of the power storage element upon the execution of the transmission process, and determine that the output level of the photovoltaic element is in the first state when a measured voltage value that is equal to or larger than a threshold is continuously acquired a predetermined number of times or more.

8. The wireless communication apparatus according to claim 4, further comprising:

an activation timer configured to supply a trigger for executing the transmission process to the wireless communication circuit based on a timer value, wherein the wireless communication circuit is further configured to intermittently execute the transmission process for transmitting the first signal in accordance with the trigger received from the activation timer, measure the voltage of the power storage element and acquire measured voltage values of the power storage element upon the execution of the transmission process, acquire an estimated generated current value of the photovoltaic element based on a differential voltage value between the last measured voltage value and the previously measured voltage value, correct the timer value of the activation timer based on the estimated generated current value and the differential voltage value, and determine, based on the timer value after the correction, whether or not the output level of the photovoltaic element is in the first state.

9. A wireless communication system comprising:

a wireless communication apparatus having an optical sensor and configured to transmit a first signal in accordance with a predetermined wireless communication scheme; and a setting apparatus configured to receive the first signal, wherein the wireless communication apparatus is configured to transmit the first signal including first information indicating that a connection request is allowed when an output level of the optical sensor is in a first state that is an output state in which the output level of the optical sensor is equal to or higher than a predetermined threshold, and transmit the first signal including second information indicating that the connection request is not allowed when the output level of the optical sensor is not in the first state, and wherein the setting apparatus is configured to transmit, to the wireless communication apparatus, a second signal including an instruction to write data when the first signal received by the setting apparatus includes the first information.

10. A wireless communication method, performed by a computer including an optical sensor and a wireless communication circuit configured to execute a transmission process for transmitting a first signal based on data stored in a storage element and a reception process for receiving a second signal in response to the transmission of the first signal, the method comprising:

transmitting the first signal including first information indicating that a connection request is allowed when an output level of the optical sensor is in a first state that is an output state in which the output level of the optical sensor is equal to or higher than a predetermined threshold, and transmitting the first signal including second information indicating that the connection request is not allowed when the output level of the optical sensor is not in the first state.

* * * * *

UNITED STATES PATENT AND TRADEMARK OFFICE
CERTIFICATE OF CORRECTION

PATENT NO. : 10,354,513 B2
APPLICATION NO. : 15/923702
DATED : July 16, 2019
INVENTOR(S) : Jun-ichi Nagata It is certified that error appears in the above-identified patent and that said Letters Patent is hereby corrected as shown below:

On the Title Page

(73) Assignee:
Should read:
-- FUJITSU LIMITED, Kawasaki (JP) --.

Signed and Sealed this
Third Day of September, 2019

Andrei Iancu
*Director of the United States Patent and Trademark Office*